United States Patent
Lei et al.

(10) Patent No.: US 12,369,035 B2
(45) Date of Patent: Jul. 22, 2025

(54) TERMINAL DEVICE VERIFICATION METHOD AND APPARATUS

(71) Applicant: HUAWEI TECHNOLOGIES CO., LTD., Shenzhen (CN)

(72) Inventors: Zhongding Lei, Singapore (SG); Haiguang Wang, Singapore (SG); Xin Kang, Singapore (SG)

(73) Assignee: Huawei Technologies Co., Ltd, Shenzhen (CN)

( * ) Notice: Subject to any disclaimer, the term of this patent is extended or adjusted under 35 U.S.C. 154(b) by 259 days.

(21) Appl. No.: 17/957,906

(22) Filed: Sep. 30, 2022

(65) Prior Publication Data
US 2023/0044476 A1    Feb. 9, 2023

Related U.S. Application Data

(63) Continuation of application No. PCT/CN2020/082222, filed on Mar. 30, 2020.

(51) Int. Cl.
  *H04W 12/50*  (2021.01)
  *H04L 9/30*   (2006.01)
  (Continued)

(52) U.S. Cl.
  CPC .............. *H04W 12/50* (2021.01); *H04L 9/30* (2013.01); *H04L 9/3247* (2013.01); *H04W 12/069* (2021.01); *H04W 12/108* (2021.01)

(58) Field of Classification Search
  CPC .............. H04W 12/50; H04W 12/108; H04W 12/069; H04L 9/30; H04L 9/3247
  See application file for complete search history.

(56) References Cited

U.S. PATENT DOCUMENTS

| 11,805,562 B2* | 10/2023 | Hong | H04W 60/04 |
| 2012/0144201 A1* | 6/2012 | Anantha | H04L 9/3247 |
| | | | 713/172 |

(Continued)

FOREIGN PATENT DOCUMENTS

| CN | 106100721 A | 11/2016 |
| CN | 109729565 A | 5/2019 |

(Continued)

OTHER PUBLICATIONS

"3rd Generation Partnership Project; Technical Specification Group Services and System Aspects; Unmanned Aerial System (UAS) support in 3GPP; Stage 1; Release 17," 3GPP TS 22.125 V17.1.0, Total 16 pages, 3rd Generation Partnership Project, Valbonne, France (Dec. 2019).

(Continued)

*Primary Examiner* — Kambiz Zand
*Assistant Examiner* — Afaq Ali
(74) *Attorney, Agent, or Firm* — Leydig, Voit & Mayer, Ltd.

(57) ABSTRACT

A terminal device verification method and an apparatus are provided. The method includes: a first network device receiving a first message from a first terminal device. Then, the first network device verifies a pairing relationship between the first terminal device and a second terminal device. After the verification on the pairing relationship between the first terminal device and the second terminal device succeeds, the first network device sends a second message to the first terminal device, where the second message include first indication information, and the first indication information is used to indicate a pairing result of the first terminal device and the second terminal device. The pairing relationship between the first terminal device and the second terminal device is verified, so that the first terminal (Continued)

device and the second terminal device can be securely paired, to improve use security of the first terminal device and the second terminal device.

20 Claims, 13 Drawing Sheets

(51) Int. Cl.
*H04L 9/32* (2006.01)
*H04W 12/069* (2021.01)
*H04W 12/108* (2021.01)

(56) References Cited

U.S. PATENT DOCUMENTS

| | | | | |
|---|---|---|---|---|
| 2016/0197934 | A1* | 7/2016 | Muraoka | G06F 21/34 726/7 |
| 2016/0294822 | A1* | 10/2016 | George | H04L 63/0861 |
| 2018/0253092 | A1 | 9/2018 | Trapero Esteban et al. | |
| 2019/0097809 | A1 | 3/2019 | Dan et al. | |
| 2019/0273968 | A1* | 9/2019 | Zerr | H04N 21/2541 |
| 2020/0015301 | A1* | 1/2020 | Zhang | H04W 12/50 |
| 2020/0304990 | A1* | 9/2020 | Azam | H04W 12/06 |
| 2021/0045169 | A1* | 2/2021 | Pupakdee | H04W 12/50 |

FOREIGN PATENT DOCUMENTS

| | | |
|---|---|---|
| CN | 109756447 A | 5/2019 |
| CN | 109792786 A | 5/2019 |
| CN | 110838245 A | 2/2020 |
| EP | 3425994 A1 | 1/2019 |
| EP | 3893594 A1 | 10/2021 |
| WO | 2021087696 A1 | 5/2021 |

OTHER PUBLICATIONS

"3rd Generation Partnership Project; Technical Specification Group Services and System Aspects; Study on supporting Unmanned Aerial Systems (UAS) connectivity, Identification and tracking (Release 17)," 3GPP TR 23.754 V0.1.0, pp. 1-18, 3rd Generation Partnership Project, Valbonne, France (Jan. 2020).

* cited by examiner

TERMINAL DEVICE VERIFICATION METHOD AND APPARATUS

CROSS-REFERENCE TO RELATED APPLICATIONS

This application is a continuation of International Application No. PCT/CN2020/082222, filed on Mar. 30, 2020, the disclosure of which is hereby incorporated by reference in its entirety.

TECHNICAL FIELD

This application relates to the field of communication technologies, and in particular, to a terminal device verification method and an apparatus.

BACKGROUND

An unmanned aerial system (UAS) usually includes two parts of devices, for example, an unmanned aerial vehicle (UAV) and an unmanned aerial vehicle controller (UAVC). The unmanned aerial vehicle may fly autonomously or by receiving and following instructions from the controller. In addition, the unmanned aerial vehicle and the controller may further transmit data to each other. For example, the unmanned aerial vehicle may send a photograph, a video, and/or the like to the controller through aerial photography (including a data receiving and storage function and the like). Communication (including control and/or data transmission) between the controller and the unmanned aerial vehicle is usually performed through a point-to-point direct connection by using a wireless signal.

Recently, an idea of using a mobile communication network to implement communication between the unmanned aerial vehicle and the controller has attracted wide attention. In one aspect, the mobile communication network has many commercial advantages, for example, wide coverage, high reliability, and support for high-speed movement. The unmanned aerial system can implement beyond visual line-of-sight and highly reliable flight through a network connection. In another aspect, the mobile communication network also provides a more reliable supervision manner for a supervision department. For example, the mobile communication network can prevent an event such as interference of an unmanned aerial vehicle to aircraft flight operations or a terrorist attack initiated by an unmanned aerial vehicle.

Therefore, how to introduce the unmanned aerial system into the mobile communication network to ensure security of the unmanned aerial system, supervision reliability, and the like is an urgent problem to be resolved.

SUMMARY

This application provides a terminal device verification method and an apparatus, to effectively verify a pairing relationship between a first terminal device and a second terminal device and improve terminal device use security.

According to a first aspect, this application provides a terminal device verification method. The method includes: A first network device receives a first message from a first terminal device, where the first message includes an identity of the first terminal device and/or an identity of a second terminal device that is paired with the first terminal device. The first network device verifies a pairing relationship between the first terminal device and the second terminal device based on the identity of the first terminal device and/or the identity of the second terminal device.

After the verification on the pairing relationship between the first terminal device and the second terminal device succeeds, the first network device sends a second message to the first terminal device, where the second message includes first indication information, and the first indication information is used to indicate a pairing result of the first terminal device and the second terminal device.

In this embodiment of this application, the first terminal device may be an unmanned aerial vehicle, and the second terminal device may be a controller; or the first terminal device may be a controller, and the second terminal device may be an unmanned aerial vehicle. The first network device may be an unmanned aerial system traffic management (UAS traffic management, UTM) device, an unmanned aerial system service supplier (UAS service supplier, USS) device, an authentication, authorization, and accounting (authentication authorization accounting, AAA) server, or the like. In addition, the first message may be further used to request to verify the pairing relationship between the first terminal device and the second terminal device.

In this embodiment of this application, only after the first network device successfully verifies the pairing relationship between the first terminal device and the second terminal device, the first network device authorizes the first terminal device to use a mobile network device to control the second terminal device. Therefore, in one aspect, an unauthorized first terminal device is prevented from randomly controlling the second terminal device, to improve security of pairing the first terminal device with the second terminal device. In another aspect, impact on use of another terminal device due to access of any terminal device to a mobile communication network is avoided, to effectively ensure security and reliability of accessing the mobile communication network by the first terminal device and the second terminal device.

It may be understood that the second terminal device may alternatively control the first terminal device based on different roles of the first terminal device and the second terminal device.

In a possible implementation, the first message further includes a digital signature of the pairing relationship between the first terminal device and the second terminal device. That the first network device verifies a pairing relationship between the first terminal device and the second terminal device based on the identity of the first terminal device and/or the identity of the second terminal device includes: The first network device verifies the digital signature based on the identity of the first terminal device and/or the identity of the second terminal device and a first public key, where the first public key is a public key pre-stored in the first network device.

In this embodiment of this application, that the first network device successfully verifies the digital signature may be understood as that the first network device successfully verifies the pairing relationship between the first terminal device and the second terminal device. In other words, in this embodiment of this application, the digital signature is a digital signature of the pairing relationship between the first terminal device and the second terminal device.

Optionally, the foregoing terminal device verification method provided in this application may be alternatively replaced with the following:

A first network device receives a first message from a first terminal device. The first network device verifies a pairing relationship between the first terminal device and a second terminal device in response to the first message. After the verification on the pairing relationship between the first terminal device and the second terminal device succeeds, the first network device sends a second message to the first terminal device, where the second message includes first indication information, and the first indication information is used to indicate a pairing result of the first terminal device and the second terminal device.

Optionally, the first message may further include an identity of the first terminal device and/or an identity of the second terminal device.

Optionally, the first message further includes a digital signature of the pairing relationship between the first terminal device and the second terminal device. That the first network device verifies a pairing relationship between the first terminal device and a second terminal device includes: The first network device verifies the digital signature based on a first public key, where the first public key is a public key pre-stored in the first network device.

In a possible implementation, the first message further includes an identifier of the first public key, and the identifier of the first public key is used to identify the first public key.

When the first network device stores two or more public keys, the first message includes the identifier of the first public key, so that the first network device can clearly learn of a specific public key for verifying the digital signature. This improves efficiency of verifying the pairing relationship by the first network device while ensuring security of pairing the first terminal device with the second terminal device.

In a possible implementation, the first message includes a credential of the first terminal device, and the pairing relationship between the first terminal device and the second terminal device is included in the credential of the first terminal device.

In this embodiment of this application, the credential of the first terminal device may include a certificate or a token of the first terminal device. The certificate or the token of the first terminal device may include a digital signature, the identity of the first terminal device, and the identity of the second terminal device. In other words, the certificate or the token of the first terminal device may include the digital signature and the pairing relationship between the first terminal device and the second terminal device.

In a possible implementation, the first message includes a credential of the first terminal device and a credential of the second terminal device, and the credential of the first terminal device and the credential of the second terminal device are used to indicate the pairing relationship between the first terminal device and the second terminal device.

In this embodiment of this application, the credential of the first terminal device may include any one of a certificate, a token, or a public key of the first terminal device. The credential of the second terminal device may include any one of a certificate, a token, or a public key of the second terminal device. In this case, that the first network device verifies the digital signature may be understood as that the first network device verifies a digital signature of the certificate of the first terminal device and a digital signature of the certificate of the second terminal device.

In a possible implementation, the first message includes a credential of the first terminal device or a credential of the second terminal device, and content of the credential of the first terminal device and content of the credential of the second terminal device are partially the same.

In this embodiment of this application, partial content may be content pre-agreed on by the first terminal device and the second terminal device. For example, content such as a key, a password, a passphrase, or a verification code included in the credential of the first terminal device is the same as that included in the credential of the second terminal device. It may be understood that the key, the password, the passphrase, the verification code, or the like shown above may also be understood as a symmetric/shared key, a shared password, or the like. In this case, whether the credential of the first terminal device or the credential of the second terminal device includes the digital signature is not limited in this embodiment of this application. If the credential of the first terminal device or the credential of the second terminal device does not include the digital signature, the first message may additionally include the digital signature. In this case, the first network device may verify the digital signature included in the first message. It should be noted that the credential of the first terminal device or the credential of the second terminal device indicates the pairing relationship between the first terminal device and the second terminal device.

In a possible implementation, the first message includes an identifier of a credential of the first terminal device or an identifier of a credential of the second terminal device, and the identifier of the credential of the first terminal device is the same as the identifier of the credential of the second terminal device.

In this embodiment of this application, the digital signature of the pairing relationship between the first terminal device and the second terminal device may be understood as a digital signature of the identifier of the credential of the first terminal device or a digital signature of the identifier of the credential of the second terminal device.

In a possible implementation, the first message includes an identifier of a credential of the first terminal device and an identifier of a credential of the second terminal device, and the identifier of the credential of the first terminal device and the identifier of the credential of the second terminal device are used to indicate the pairing relationship between the first terminal device and the second terminal device.

In this embodiment of this application, the digital signature of the pairing relationship between the first terminal device and the second terminal device may be understood as a digital signature of the identifier of the credential of the first terminal device and a digital signature of the identifier of the credential of the second terminal device.

In a possible implementation, the credential includes any one or more of a certificate, a public key, or a token.

In this embodiment of this application, the credential of the first terminal device includes any one or more of a certificate of the first terminal device, a public key of the first terminal device, or a token of the first terminal device.

In a possible implementation, after the verification on the pairing relationship between the first terminal device and the second terminal device succeeds, the method further includes: The first network device stores the identity of the first terminal device and the identity of the second terminal device.

In a possible implementation, after the verification on the pairing relationship between the first terminal device and the second terminal device succeeds, the method further includes: The first network device stores the identity of the second terminal device into a context of the first terminal device; and the first network device stores the identity of the first terminal device into a context of the second terminal device.

Alternatively, in a possible implementation, that the first network device stores the identity of the first terminal device and the identity of the second terminal device includes: The first network device stores the identity of the second terminal device into a context of the first terminal device; and the first network device stores the identity of the first terminal device into a context of the second terminal device.

In a possible implementation, after the verification on the pairing relationship between the first terminal device and the second terminal device succeeds, the method further includes: The first network device sends a third message to a second network device, where the third message includes the identity of the first terminal device and the identity of the second terminal device, and the identity of the first terminal device and the identity of the second terminal device are used to indicate that the first terminal device and the second terminal device have the pairing relationship.

In this embodiment of this application, the first network device sends the third message to the second network device, so that the second network device can store the identity of the first terminal device and the identity of the second terminal device that is paired with the first terminal device. In other words, the second network device may store the pairing relationship between the first terminal device and the second terminal device. Therefore, when the first terminal device and the second terminal device need to be paired subsequently, the second network device may directly perform verification, to improve pairing efficiency of the first terminal device and the second terminal device.

According to a second aspect, this application provides a terminal device verification method. The method includes: A second network device receives a fourth message from a first terminal device, where the fourth message includes an identity of the first terminal device and/or an identity of a second terminal device that is paired with the first terminal device. The second network device verifies a pairing relationship between the first terminal device and the second terminal device. After the verification on the pairing relationship between the first terminal device and the second terminal device succeeds, the second network device sends a fifth message to the first terminal device, where the fifth message includes second indication information, and the second indication information is used to indicate a pairing result of the first terminal device and the second terminal device.

In a possible implementation, before that the second network device verifies a pairing relationship between the first terminal device and the second terminal device, the method further includes: The second network device receives a third message sent by a first network device, where the third message includes the identity of the first terminal device and the identity of the second terminal device, and the identity of the first terminal device and the identity of the second terminal device are used to indicate that the first terminal device and the second terminal device have the pairing relationship.

For beneficial effects of the second aspect, refer to beneficial effects of the first aspect. Details are not described herein.

According to a third aspect, this application provides a terminal device verification method. The method includes: A server receives a sixth message, where the sixth message includes a first identity and a second identity of a first terminal device. The server determines permission of the first terminal device based on the first identity of the first terminal device. When the permission of the first terminal device succeeds, the server sends a seventh message to a first network device, where the seventh message includes the second identity of the first terminal device and a third identity of a second terminal device that is paired with the first terminal device, or the seventh message includes the first identity of the first terminal device and a fourth identity of a second terminal device that is paired with the first terminal device.

In a possible implementation, before that the server sends a seventh message to a first network device, the method further includes: The server authenticates the first terminal device based on the first identity of the first terminal device.

In a possible implementation, the server stores the second identity of the first terminal device and the third identity of the second terminal device that have a pairing relationship, or the server stores the first identity of the first terminal device and the fourth identity of the second terminal device that have a pairing relationship.

In a possible implementation, before that the server sends a seventh message to a first network device, the method further includes: The server obtains, based on the first identity of the first terminal device, the fourth identity of the second terminal device that is paired with the first terminal device. Alternatively, the server obtains, based on the second identity of the first terminal device, the third identity of the second terminal device that is paired with the first terminal device.

In this embodiment of this application, after the server successfully verifies a pairing relationship between the first terminal device and the second terminal device, the server may send the pairing relationship to the first network device, so that the first network device may perform a pairing process on the first terminal device and the second terminal device. For example, the first network device stores an identity of the first terminal device into a context of the second terminal device, and stores an identity of the second terminal device into a context of the first terminal device. Further, the first network device may send a pairing result to the first terminal device. In addition, the first network device may further send the pairing relationship to a second network device, so that the second network device may perform the method shown in the second aspect.

For specific implementations of the first network device and the second network device, refer to the method shown in the first aspect or the second aspect. Details are not described herein again.

According to a fourth aspect, this application provides a communication apparatus, configured to perform the method in any one of the first aspect or the possible implementations of the first aspect. Specifically, the communication apparatus includes units for performing the method in any one of the first aspect or the possible implementations of the first aspect.

For example, the communication apparatus includes a transceiver unit and a processing unit.

According to a fifth aspect, this application provides a communication apparatus, configured to perform the method in any one of the second aspect or the possible implementations of the second aspect. Specifically, the communication apparatus includes units for performing the method in any one of the second aspect or the possible implementations of the second aspect.

For example, the communication apparatus includes a transceiver unit and a processing unit.

According to a sixth aspect, this application provides a communication apparatus. The communication apparatus includes a transceiver unit and a processing unit. The transceiver unit is configured to receive a sixth message, where the sixth message includes a first identity and a second identity of a first terminal device. The processing unit is configured to determine permission of the first terminal device based on the first identity of the first terminal device. The transceiver unit is further configured to: when the permission of the first terminal device succeeds, send a seventh message to a first network device, where the seventh message includes the second identity of the first terminal device and a third identity of a second terminal device that is paired with the first terminal device, or the seventh message includes the first identity of the first terminal device and a fourth identity of a second terminal device that is paired with the first terminal device.

In a possible implementation, the processing unit is further configured to authenticate the first terminal device based on the first identity of the first terminal device.

In a possible implementation, a server stores the second identity of the first terminal device and the third identity of the second terminal device that have a pairing relationship, or a server stores the first identity of the first terminal device and the fourth identity of the second terminal device that have a pairing relationship.

In a possible implementation, the processing unit is further configured to: obtain, based on the first identity of the first terminal device, the fourth identity of the second terminal device that is paired with the first terminal device; or obtain, based on the second identity of the first terminal device, the third identity of the second terminal device that is paired with the first terminal device.

It may be understood that the communication apparatus may be a server or the like.

According to a seventh aspect, this application provides a communication apparatus. The communication apparatus includes a processor, configured to execute a program stored in a memory. When the program is executed, the communication apparatus is enabled to perform the method in any one of the first aspect or the possible implementations of the first aspect.

In a possible implementation, the memory is located outside the communication apparatus.

According to an eighth aspect, this application provides a communication apparatus. The communication apparatus includes a processor, configured to execute a program stored in a memory. When the program is executed, the communication apparatus is enabled to perform the method in any one of the second aspect or the possible implementations of the second aspect.

In a possible implementation, the memory is located outside the communication apparatus.

According to a ninth aspect, this application provides a communication apparatus. The communication apparatus includes a processor, configured to execute a program stored in a memory. When the program is executed, the communication apparatus is enabled to perform the method in any one of the third aspect or the possible implementations of the third aspect.

In a possible implementation, the memory is located outside the communication apparatus.

According to a tenth aspect, this application provides a communication apparatus. The communication apparatus includes a processor, a memory, and a program that is stored in the memory and that is executable on the processor. When the program is run, the communication apparatus is enabled to perform the method in any one of the first aspect or the possible implementations of the first aspect.

According to an eleventh aspect, this application provides a communication apparatus. The communication apparatus includes a processor, a memory, and a program that is stored in the memory and that is executable on the processor. When the program is run, the communication apparatus is enabled to perform the method in any one of the second aspect or the possible implementations of the second aspect.

According to a twelfth aspect, this application provides a communication apparatus. The communication apparatus includes a processor, a memory, and a program that is stored in the memory and that is executable on the processor. When the program is run, the communication apparatus is enabled to perform the method in any one of the third aspect or the possible implementations of the third aspect.

According to a thirteenth aspect, this application provides a communication apparatus. The communication apparatus includes a processor, a memory, and a transceiver. The transceiver is configured to receive a signal or send a signal. The memory is configured to store computer code. The processor is configured to execute the computer code, so that the communication apparatus performs the method in any one of the first aspect or the possible implementations of the first aspect.

According to a fourteenth aspect, this application provides a communication apparatus. The communication apparatus includes a processor, a memory, and a transceiver. The transceiver is configured to receive a signal or send a signal. The memory is configured to store computer code. The processor is configured to execute the computer code, so that the communication apparatus performs the method in any one of the second aspect or the possible implementations of the second aspect.

According to a fifteenth aspect, this application provides a communication apparatus. The communication apparatus includes a processor, a memory, and a transceiver. The transceiver is configured to receive a signal or send a signal. The memory is configured to store computer code. The processor is configured to execute the computer code, so that the communication apparatus performs the method in any one of the third aspect or the possible implementations of the third aspect.

According to a sixteenth aspect, this application provides a communication apparatus. The communication apparatus includes a processing circuit and an interface circuit. The interface circuit is configured to obtain a first message, where the first message includes an identity of a first terminal device and/or an identity of a second terminal device that is paired with the first terminal device. The processing circuit is configured to verify a pairing relationship between the first terminal device and the second terminal device based on the identity of the first terminal device and/or the identity of the second terminal device. The interface circuit is further configured to: after the verification on the pairing relationship between the first terminal device and the second terminal device succeeds, output a second message, where the second message includes first indication information, and the first indication information is used to indicate a pairing result of the first terminal device and the second terminal device.

In a possible implementation, the processing circuit is further configured to store the identity of the first terminal device and the identity of the second terminal device.

In a possible implementation, the processing circuit is further configured to: store the identity of the second terminal device into a context of the first terminal device; and store the identity of the first terminal device into a context of the second terminal device.

In a possible implementation, the interface circuit is further configured to output a third message, where the third message includes the identity of the first terminal device and the identity of the second terminal device, and the identity of the first terminal device and the identity of the second terminal device are used to indicate that the first terminal device and the second terminal device have the pairing relationship.

It may be understood that for descriptions of a digital signature and a credential, refer to the first aspect. Details are not described herein again.

According to a seventeenth aspect, this application provides a communication apparatus. The communication apparatus includes a processing circuit and an interface circuit. The interface circuit is configured to obtain a fourth message, where the fourth message includes an identity of a first terminal device and/or an identity of a second terminal device that is paired with the first terminal device. The processing circuit is configured to verify a pairing relationship between the first terminal device and the second terminal device. The interface circuit is further configured to output a fifth message, where the fifth message includes second indication information, and the second indication information is used to indicate a pairing result of the first terminal device and the second terminal device.

In a possible implementation, the interface circuit is further configured to obtain a third message, where the third message includes the identity of the first terminal device and the identity of the second terminal device, and the identity of the first terminal device and the identity of the second terminal device are used to indicate that the first terminal device and the second terminal device have the pairing relationship.

According to an eighteenth aspect, this application provides a communication apparatus. The communication apparatus includes a processing circuit and an interface circuit. The interface circuit is configured to obtain a sixth message, where the sixth message includes a first identity and a second identity of a first terminal device. The processing circuit is configured to determine permission of the first terminal device based on the first identity of the first terminal device. The interface circuit is further configured to output a seventh message, where the seventh message includes the second identity of the first terminal device and a third identity of a second terminal device that is paired with the first terminal device, or the seventh message includes the first identity of the first terminal device and a fourth identity of a second terminal device that is paired with the first terminal device.

In a possible implementation, the processing circuit is further configured to authenticate the first terminal device based on the first identity of the first terminal device.

In a possible implementation, a server stores the second identity of the first terminal device and the third identity of the second terminal device that have a pairing relationship, or a server stores the first identity of the first terminal device and the fourth identity of the second terminal device that have a pairing relationship.

In a possible implementation, the processing circuit is further configured to: obtain, based on the first identity of the first terminal device, the fourth identity of the second terminal device that is paired with the first terminal device; or obtain, based on the second identity of the first terminal device, the third identity of the second terminal device that is paired with the first terminal device.

According to a nineteenth aspect, this application provides a computer-readable storage medium. The computer-readable storage medium is configured to store a computer program. When the computer program is run on a computer, the method shown in any one of the first aspect or the possible implementations of the first aspect is performed.

According to a twentieth aspect, this application provides a computer-readable storage medium. The computer-readable storage medium is configured to store a computer program. When the computer program is run on a computer, the method shown in any one of the second aspect or the possible implementations of the second aspect is performed.

According to a twenty-first aspect, this application provides a computer-readable storage medium. The computer-readable storage medium is configured to store a computer program. When the computer program is run on a computer, the method shown in any one of the third aspect or the possible implementations of the third aspect is performed.

According to a twenty-second aspect, this application provides a computer program product. When the computer program product runs on a computer, the method shown in any one of the first aspect or the possible implementations of the first aspect is performed.

In a possible implementation, the computer program product includes a computer program or computer code. When the computer program or the computer code is executed, the method shown in any one of the first aspect or the possible implementations of the first aspect is implemented.

According to a twenty-third aspect, this application provides a computer program product. When the computer program product runs on a computer, the method shown in any one of the second aspect or the possible implementations of the second aspect is performed.

In a possible implementation, the computer program product includes a computer program or computer code. When the computer program or the computer code is executed, the method shown in any one of the second aspect or the possible implementations of the second aspect is implemented.

According to a twenty-fourth aspect, this application provides a computer program product. When the computer program product runs on a computer, the method shown in any one of the third aspect or the possible implementations of the third aspect is performed.

In a possible implementation, the computer program product includes a computer program or computer code. When the computer program or the computer code is executed, the method shown in any one of the third aspect or the possible implementations of the third aspect is implemented.

According to a twenty-fifth aspect, this application provides a computer program, configured to implement the method shown in any one of the first aspect or the possible implementations of the first aspect.

Alternatively, when the computer program is run on a computer, the method shown in any one of the first aspect or the possible implementations of the first aspect is performed.

According to a twenty-sixth aspect, this application provides a computer program, configured to implement the method shown in any one of the second aspect or the possible implementations of the second aspect.

Alternatively, when the computer program is run on a computer, the method shown in any one of the second aspect or the possible implementations of the second aspect is performed.

According to a twenty-seventh aspect, this application provides a computer program, configured to implement the method shown in any one of the third aspect or the possible implementations of the third aspect.

Alternatively, when the computer program is run on a computer, the method shown in any one of the third aspect or the possible implementations of the third aspect is performed.

According to a twenty-eighth aspect, this application provides a wireless communication system. The wireless communication system includes a first network device and a first terminal device. The first network device is configured to perform the method shown in any one of the first aspect or the possible implementations of the first aspect.

In a possible implementation, the wireless communication system further includes a second network device. The second network device is configured to perform the method shown in any one of the second aspect or the possible implementations of the second aspect.

In a possible implementation, the wireless communication system further includes a server. The server is configured to perform the method shown in any one of the third aspect or the possible implementations of the third aspect.

DESCRIPTION OF EMBODIMENTS

Figure 1:
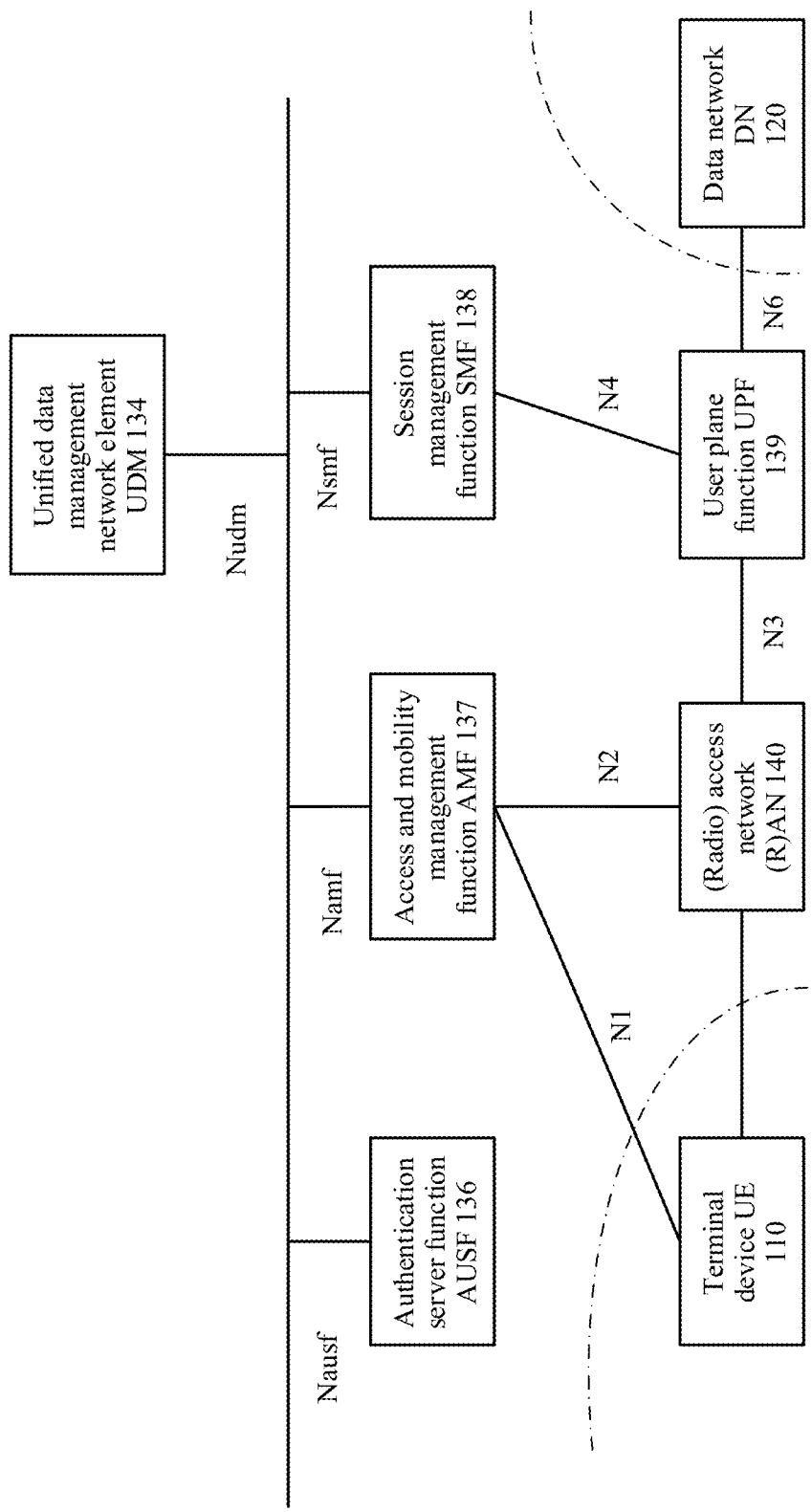
FIG. 1 is a schematic diagram of a system of a mobile communication network, according to an embodiment of this application.

To make the objectives, technical solutions, and advantages of this application clearer, the following further describes this application in detail with reference to the accompanying drawings.

In the specification, claims, and accompanying drawings of this application, the terms "first", "second", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that a particular characteristic, structure, or feature described with reference to embodiments may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

In this application, "at least one (item)" means one or more, "a plurality of" means two or more, "at least two (items)" means two or three or more. The term "and/or" is used to describe an association relationship between associated objects and indicates that three relationships may exist. For example, "A and/or B" may indicate the following three cases: Only A exists, only B exists, and both A and B exist, where A and B may be singular or plural. The character "/" usually indicates an "or" relationship between the associated objects. "At least one item (piece) of the following" or a similar expression thereof means any combination of these items, including any combination of singular items (pieces) or plural items (pieces). For example, at least one of a, b, or c may represent a, b, c, "a and b", "a and c", "b and c", or "a, b, and c".

The following first describes a communication system to which this application is applied.

The technical solutions provided in this application may be applied to various communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) communication system, a new radio (NR) communication system, or another future communication system such as a 6G communication system.

For example, this application is applied to a 5G communication system. The following describes a network function in the 5G system by using an example.

Refer to FIG. 1. An example in which a network architecture shown in FIG. 1 is a 5G network architecture that is based on a service-oriented architecture defined in a 3rd generation partnership project (3GPP) standardization process is used. As shown in FIG. 1, the network architecture may include at least three parts: a terminal device part, an operator network part, a data network (DN) part, and the like respectively.

The terminal device part may include a terminal device 110, and the terminal device 110 may also be referred to as user equipment (UE). The terminal device 110 in this application is a device with a wireless transceiver function, and may communicate with one or more core network (CN) devices (which may also be referred to as core devices) through an access network device (which may also be referred to as an access device) in an access network (AN) 140. The terminal device 110 may also be referred to as an access terminal, a terminal, a subscriber unit, a subscriber station, a mobile station, a remote station, a remote terminal, a mobile device, a user terminal, a wireless network device, a user agent, a user apparatus, or the like. In a possible implementation, the terminal device 110 may be deployed on land, including an indoor device, an outdoor device, a handheld device, or a vehicle-mounted device; or may be deployed on the water surface (for example, in a steamship); or may be deployed in the air (for example, on an airplane, a balloon, or a satellite). In a possible implementation, the terminal device 110 may be a handheld device, a vehicle-mounted device, a wearable device, an unmanned aerial vehicle device, a terminal in the internet of things, the internet of vehicles, a terminal of any form in a 5G network, a terminal of any form in a future network, or the like that has a wireless communication function. This is not limited in this application.

In embodiments of this application, the terminal device includes a first terminal device and a second terminal device. The first terminal device is an unmanned aerial vehicle, and the second terminal device is a controller. Alternatively, the first terminal device is a controller, and the second terminal device is an unmanned aerial vehicle. It may be understood that a method that is provided in this application and that is applicable to the first terminal device is also applicable to the second terminal device. It may be understood that the unmanned aerial vehicle in this application may be an unmanned aerial vehicle of any form, an unmanned aerial vehicle of any form in a future network, or the like. Similarly, the controller in this application may be a controller of any form, a controller of any form in the future network, or the like.

A part operated by an operator in various communication systems may be referred to as an operator network. The operator network may also be referred to as a public land mobile network (PLMN) network, and is a network established and operated by a government or an operator approved by the government for the purpose of providing a land mobile communication service for the public. The operator network is mainly a public network used by a mobile network operator (MNO) to provide a mobile broadband access service for a user. For example, the operator network or the PLMN network in this application may alternatively be a network that meets a requirement of a 3GPP standard, which is referred to as a 3GPP network for short. The 3GPP network may be usually operated by an operator, and includes but is not limited to a 5th generation mobile communication (5G), a 4th generation mobile communication (4G) network, or the like.

Expansion of the mobile broadband access service is accompanied by development of the operator network, to better support diversified business models, and meet requirements of more diversified application services and more industries. For example, to provide better and more comprehensive services for more industries, a network architecture is adjusted for the 5G network relative to the 4G network. For example, in the 5G network, a mobility management entity (MME) in the 4G network is split into a plurality of network functions such as an access and mobility management function (AMF) (which may also be referred to as an AMF network function or an AMF network function entity) and a session management function (SMF) (which may also be referred to as an SMF network function or an SMF network function entity). Therefore, the network architecture shown in this application should not be understood as a limitation on this application.

As shown in FIG. 1, the operator network may include at least a unified data management (UDM) 134 (which may also be referred to as a UDM network function or a UDM network function entity), an authentication server function (AUSF) 136 (which may also be referred to as an AUSF network function or an AUSF network function entity), an AMF 137, an SMF 138, a user plane function (UPF) 139 (which may also be referred to as a UPF network function or a UPF network function entity), a (radio) access network ((R)AN) 140, and the like. In the operator network, a part other than the (radio) access network 140 part may be referred to as a core network (CN) part or a core network part.

A data network DN 120 may also be referred to as a packet data network (PDN), and is usually a network outside the operator network, for example, a third-party network. For example, the operator network may access a plurality of data networks DNs 120, and a plurality of services may be deployed in the data networks DNs 120, to provide services such as a data service and/or a voice service for the terminal device 110. The terminal device 110 may establish a connection to the operator network through an interface (for example, N1) provided by the operator network, and use the services such as the data service and/or the voice service provided by the operator network. The terminal device 110 may further access the data network DN 120 through the operator network, and use an operator service deployed in the data network DN 120 and/or a service provided by a third party. The third party may be a service provider other than the operator network and the terminal device 110, and the service provider may provide other services such as the data service and/or the voice service for the terminal device 110. A specific representation form of the third party may be specifically determined based on an actual application scenario, and is not limited herein.

For example, the following briefly describes network functions in the operator network.

The (R)AN 140 is a sub-network of the operator network, and is an implementation system between a service node in the operator network and the terminal device 110. To access the operator network, the terminal device 110 first accesses the (R)AN 140, and then connects to a network function in the operator network through the (R)AN 140. An access network device (R)AN device in embodiments of this application is a device that provides a wireless communication function for the terminal device 110, and may also be referred to as a network device, an access device, or the like. The (R)AN device includes but is not limited to a next generation NodeB (gNB) in a 5G system, an evolved NodeB (eNB) in an LTE system, a radio network controller (RNC), a NodeB (NB), a base station controller (base station controller, BSC), a base transceiver station (BTS), a home base station (home evolved NodeB, or home NodeB, HNB), a base band unit (BBU), a transmission reception point (TRP), a transmission point (TP), a small cell base station (pico), a mobile switching center, a network device in a future network, or the like. It may be understood that a specific type of the access network device is not limited in this application. In systems using different radio access technologies, devices with functions of the access network device may have different names. For ease of description, in all the embodiments of this application, the devices that provide the wireless communication function for the terminal device 110 are collectively referred to as the access network device.

The AMF 137 is a control plane network function provided by the operator network, and is responsible for access control and mobility management when the terminal device 110 accesses the operator network, for example, including functions such as mobility status management, allocation of a temporary user identity, and user authentication and authorization.

The SMF 138 is a control plane network function provided by the operator network, and is responsible for managing a protocol data unit (PDU) session of the terminal device 110. The PDU session is a channel used to transmit a PDU, and the terminal device and the DN 120 needs to transmit a PDU to each other through the PDU session. The SMF 138 may be responsible for establishment, maintenance, deletion, and the like of the PDU session. The SMF 138 includes functions related to a session, for example, session management (for example, session establishment, modification, and release, including tunnel maintenance between the UPF 139 and the (R)AN 140), selection and control of the UPF 139, service and session continuity (SSC) mode selection, and roaming.

The UPF 139 is a gateway provided by the operator and a gateway for communication between the operator network and the DN 120. The UPF 139 includes functions related to a user plane, for example, data packet routing and transmission, packet detection, service usage reporting, quality of service (QoS) processing, lawful interception, uplink packet detection, and downlink data packet storage.

The UDM 134 is a control plane function provided by the operator, and is responsible for storing information such as a subscription permanent identifier (SUPI), a credential, a security context, and subscription data of a subscriber in the operator network. The information stored by the UDM 134 may be used for authentication and authorization of the terminal device 110 for access to the operator network. The SUPI is first encrypted in a transmission process, and the encrypted SUPI is referred to as a subscription concealed identifier (SUCI). The subscriber in the operator network may be specifically a subscriber using a service provided by the operator network, for example, a user using a terminal device SIM card of China Telecom, or a user using a terminal device SIM card of China Mobile. For example, the SUPI of the subscriber may be a number of the terminal device SIM card. The credential and the security context of the subscriber may be an encryption key of the terminal device SIM card, information related to encryption of the terminal device SIM card, or the like. The security context may be a cookie, a token, or the like stored in a local terminal device (for example, a mobile phone). The subscription data of the subscriber may be a supporting service of the terminal device SIM card, for example, a traffic package or a used network of the terminal device SIM card.

The AUSF 136 is a control plane function provided by the operator, and is usually used for primary authentication, namely, authentication between the terminal device 110 (subscriber) and the operator network. It may be understood that in some deployments in this application, the AUSF 136 and the UDM 134 may be deployed together. For example, the AUSF 136 and the UDM 134 are integrated into one network element. In some other deployments in this application, the AUSF 136 and the UDM 134 may alternatively be separately deployed. For example, the AUSF 136 and the UDM 134 are deployed in different network elements. A specific manner in which the AUSF 136 and the UDM 134 may be deployed is not limited in this application. For ease of description, only the UDM 134 is shown in the following embodiments. However, a relationship between the UDM 134 and the AUSF 136 is not limited in embodiments of this application.

In FIG. 1, Nausf, Nudm, Namf, Nsmf, N1, N2, N3, N4, and N6 are interface serial numbers. For example, for meanings of the interface serial numbers, refer to meanings defined in the 3GPP standard protocol. The meanings of the interface serial numbers are not limited in this application. It should be noted that in FIG. 1, an example in which the terminal device 110 is UE is merely used for description.

Names of interfaces between network functions in FIG. 1 are merely examples. In a specific implementation, the names of the interfaces in the system architecture may be other names. This is not limited in this application. It may be understood that the operator network part shown in FIG. 1 may further include another network function, for example, a network repository function (NRF) and/or a policy control function (PCF). This is not limited in this application.

A mobility management network function in embodiments of this application may be the AMF 137 shown in FIG. 1, or may be another network function that has the AMF 137 in a future communication system. Alternatively, a mobility management network function in this application may be an MME or the like in an LTE system.

For ease of description, the terminal device verification method provided in embodiments of this application is described by using an example in which the mobility management network function is the AMF 137. Further, in embodiments of this application, the AMF 137 is referred to as an AMF for short, the unified data management UDM 134 is referred to as a UDM for short, and the terminal device 110 is referred to as UE. In other words, the AMF described below in embodiments of this application may be replaced with the mobility management network function, the UDM may be replaced with the unified data management, and the UE may be replaced with the terminal device. It may be understood that the replacement method is also applicable to another network function that is not shown.

A service-based architecture and a universal interface are used for the network architecture (for example, a 5G network architecture) shown in FIG. 1. A conventional network element function is split into several self-contained, self-managed, and reusable network function service modules based on a network function virtualization (NFV) technology. The schematic diagram of the network architecture shown in FIG. 1 may be understood as a schematic diagram of a service-based 5G network architecture in a non-roaming scenario. This application is also applicable to a roaming scenario.

The following describes a system architecture of this application.

Figure 2:
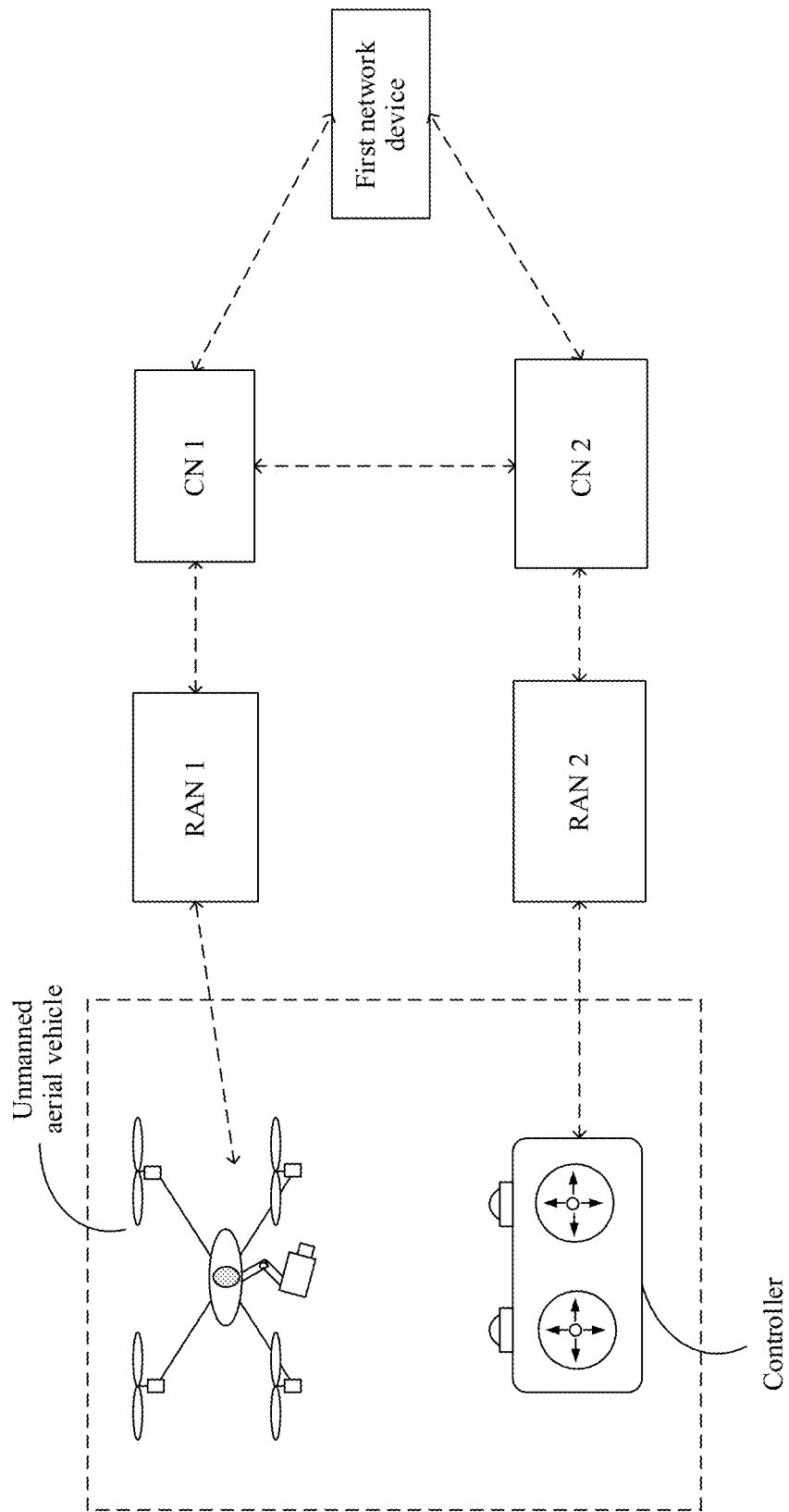
FIG. 2 is a schematic diagram of an architecture of an unmanned aerial system based on a mobile communication network, according to an embodiment of this application.

FIG. 2 is a schematic diagram of an architecture of an unmanned aerial system based on a mobile communication network according to an embodiment of this application. As shown in FIG. 2, the architecture of the unmanned aerial system includes at least an unmanned aerial vehicle, an unmanned aerial vehicle controller (referred to as a controller for short below), a radio access network (RAN), a core network (CN), and a first network device. The first network device may be deployed inside an operator network, or the first network device may be deployed outside an operator network.

A RAN 1 and a RAN 2 may respectively provide services for the unmanned aerial vehicle and the controller. If the controller and the unmanned aerial vehicle are covered by a same RAN, the two RANs (namely, the RAN 1 and the RAN 2) may alternatively be the same RAN. Similarly, a CN 1 and a CN 2 may respectively serve the RAN 1 and the RAN 2. If RANs (where the RAN 1 and the RAN 2 may be the same or different) accessed by the unmanned aerial vehicle and the controller are served by a same CN, the two core networks (namely, the CN 1 and the CN 2) may alternatively be the same core network.

In the unmanned aerial system shown in FIG. 2, the controller may control the unmanned aerial vehicle through a network, and communicate and interact with the unmanned aerial vehicle. For example, instructions sent by the controller may reach the unmanned aerial vehicle through the RAN 2, the CN 2, the CN 1, and the RAN 1. For example, when the mobile communication network is the 5G communication network (also referred to as a 5G communication system) shown in FIG. 1, the unmanned aerial vehicle and the controller shown in FIG. 2 respectively correspond to two different terminal devices 110 in FIG. 1. The RAN 1 and the RAN 2 shown in FIG. 2 respectively correspond to the two (R)ANs 140 in FIG. 1.

The first network device may be located inside the operator network, or may be located outside the operator network. For example, the first network device may be an unmanned aerial system traffic management (UTM) device, an unmanned aerial system service supplier (UAS service supplier, USS) device, or an authentication, authorization, and accounting (AAA) server. For example, the first network device may be configured to store related information of the unmanned aerial system (including the unmanned aerial vehicle and/or the controller), for example, authentication information of the unmanned aerial system. The first network device may perform identity authentication on the unmanned aerial vehicle and/or the controller based on the authentication information. A supervision department of the unmanned aerial system may also supervise operating of the unmanned aerial system through the first network device, to ensure flight control safety of the unmanned aerial vehicle, public safety, and the like.

The unmanned aerial vehicle may also be referred to as an unmanned flight vehicle, a flight vehicle, or the like. The controller may be a device specially produced for remotely controlling the unmanned aerial vehicle, or may be any one of the foregoing described terminal devices 110 such as a smartphone and a wearable device. A specific form of the controller is not limited in this application.

In addition, the core network shown in FIG. 2 may further include a second network device. The second network device may be a network function that is responsible for and participates in functions such as terminal device registration, mobility management, and session management in the core network. For example, the second network device may be an AMF, an SMF, or a UPF. The core network shown in FIG. 2 may further include a third network device. The third network device may be a network function that stores subscription and registration information of the terminal device, for example, a UDM.

The architecture of the unmanned aerial system shown in FIG. 2 is based on the 5G communication system shown in FIG. 1. In another communication system, the architecture of the unmanned aerial system shown in FIG. 2 is also applicable. Alternatively, in another communication system, the architecture of the unmanned aerial system shown in FIG. 2 may change based on deployment statuses of the access network, the core network, and the first network device.

To improve security of accessing or using the mobile communication network by the unmanned aerial vehicle and/or the controller, in addition to performing authentication and authorization on the terminal device using the mobile communication network in the unmanned aerial system, a pairing relationship between the unmanned aerial vehicle and the controller further needs to be authorized, to prevent the unmanned aerial vehicle from being controlled by an unauthorized controller. However, in one aspect, a 3GPP standard in which the 5G network is used to improve a communication service for the unmanned aerial system has just started, and has not defined how to complete pairing between the unmanned aerial vehicle and the controller and how to provision the pairing relationship between the unmanned aerial vehicle and the controller into the network. In another aspect, point-to-point pairing is usually performed between the unmanned aerial vehicle and the controller by using a short-range wireless access technology. For example, pairing is performed by using a non-3GPP mobile communication network (namely, a non-3GPP access technology) such as wireless fidelity (Wi-Fi) or Bluetooth. For example, when Bluetooth is used for device pairing, a commonly used manner is that a terminal device (for example, an unmanned aerial vehicle) displays an identity or a password of the terminal device on a display screen of the terminal device, and the other terminal device (for example, a controller) selects or enters the identity or the password with assistance of a person, and feeds back the identity or the password to the 1st terminal device (for example, the unmanned aerial vehicle), to complete pairing between the two terminal devices.

It can be learned from the foregoing process of performing terminal device pairing by using the non-3GPP mobile communication network (which may also be referred to as the non-3GPP access technology) that a manner of pairing between terminal devices is not within a control range of a 3GPP network operator, and the unmanned aerial vehicle and the controller may be randomly paired. In addition, a pairing relationship between the terminal devices is not registered in the mobile communication network either. As a result, the mobile communication network cannot learn of or control the pairing between the terminal devices.

Therefore, this application provides a terminal device verification method. The verification method may be used to verify the pairing relationship between the controller and the unmanned aerial vehicle. The controller and the unmanned aerial vehicle can be authorized to use the mobile communication network to perform operating, remote control, communication, or the like of the unmanned aerial vehicle only after the verification on the pairing relationship between the controller and the unmanned aerial vehicle succeeds. This improves security of the pairing relationship between the controller and the unmanned aerial vehicle, and further effectively ensures security of the unmanned aerial system. In addition, the pairing relationship between the unmanned aerial vehicle and the controller that is verified and authorized may be stored in the mobile communication network, so that the unmanned aerial system does not need to perform verification, authorization, and the like again in subsequent operating. It may be understood that a network shown below in this application may be understood as the mobile communication network.

The following describes in detail a terminal device verification method provided in this application.

Figure 3:
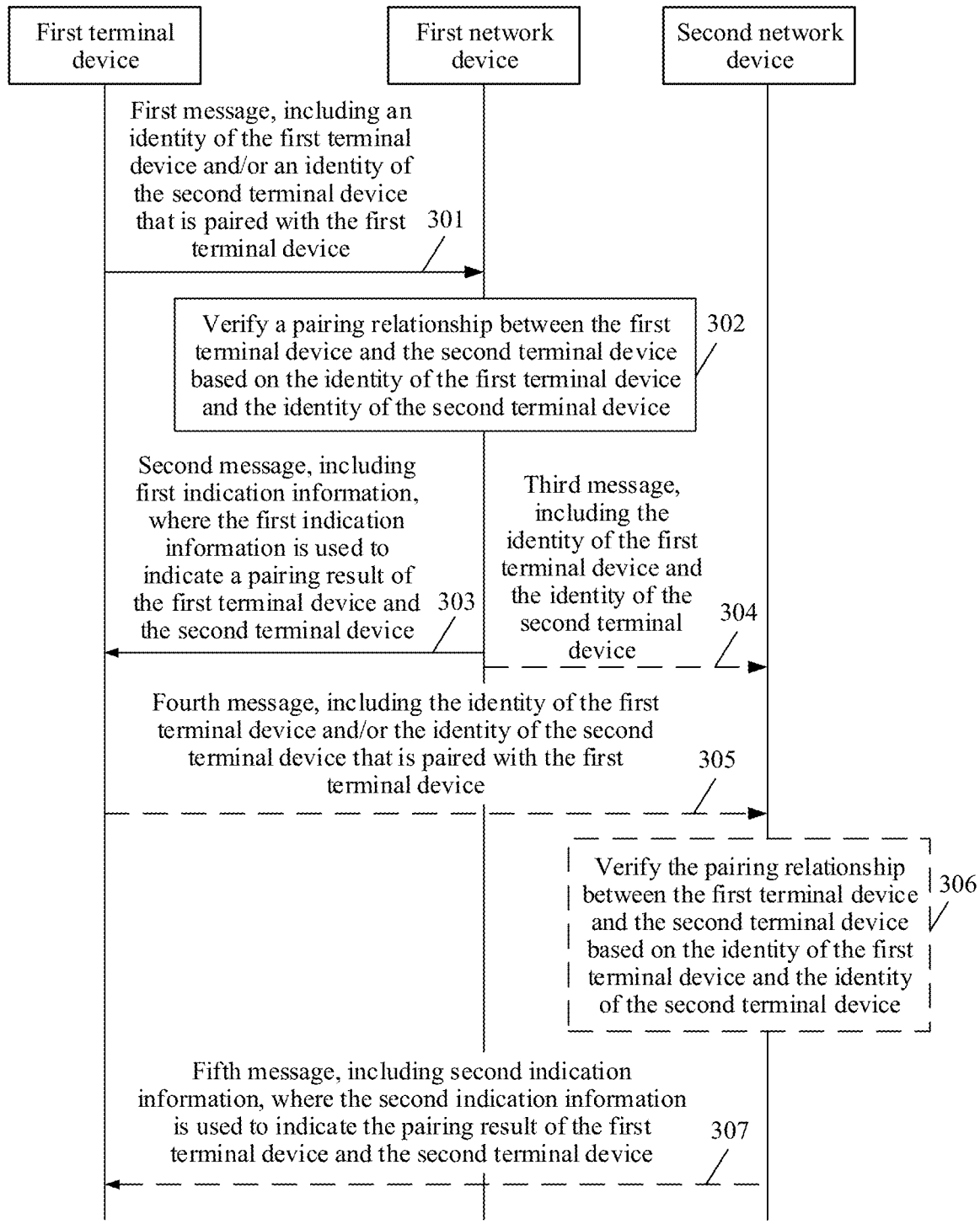
FIG. 3 is a schematic flowchart of a terminal device verification method, according to an embodiment of this application.

FIG. 3 is a schematic flowchart of a terminal device verification method according to an embodiment of this application. For example, the method may be used in the mobile communication network shown in FIG. 1, and the method may be further used in the architecture of the unmanned aerial system shown in FIG. 2. As shown in FIG. 3, the terminal device verification method includes at least the following steps.

301. A first terminal device sends a first message to a first network device; and correspondingly, the first network device receives the first message from the first terminal device, where the first message includes an identity of the first terminal device and/or an identity of a second terminal device that is paired with the first terminal device.

In this embodiment of this application, the first terminal device is an unmanned aerial vehicle, and the second terminal device is a controller; or the first terminal device is a controller, and the second terminal device is an unmanned aerial vehicle. The first network device may be a UTM device, a USS device, an AAA server, or the like.

In this embodiment of this application, a pairing manner (which may also be referred to as a pairing type) of the first terminal device and the second terminal device may include any one or more of the following: One first terminal device corresponds to one second terminal device; one first terminal device corresponds to a plurality of second terminal devices; or a plurality of first terminal devices correspond to one second terminal device. For example, one controller controls one unmanned aerial vehicle, one controller controls a plurality of unmanned aerial vehicles, or one unmanned aerial vehicle may be jointly controlled by a plurality of controllers. In other words, when one first terminal device has a pairing relationship with a plurality of second terminal devices, the first message may include an identity of the first terminal device and an identity of one or more of the plurality of second terminal devices. For example, when one first terminal device has a pairing relationship with two second terminal devices, the first message may include an identity of the first terminal device and an identity of one or both of the two second terminal devices. In addition, when a plurality of first terminal devices have a pairing relationship with one second terminal device, the first message may be a message sent by any one of the plurality of first terminal devices. A quantity of second terminal devices that have a pairing relationship with the first terminal device is not limited in this embodiment of this application. In a possible implementation, the pairing relationship between the first terminal device and the second terminal device may be determined by a vendor at delivery of the unmanned aerial vehicle and/or the controller, or may be determined by a service provider when the service provider provides an unmanned aerial system service. Optionally, the pairing relationship between the first terminal device and the second terminal device may alternatively be determined by an unmanned aerial system service provider, may be determined by an entity such as a vertical industry, or the like. How to determine the pairing relationship between the first terminal device and the second terminal device is not limited in this embodiment of this application.

In this embodiment of this application, an identity may include an identity in the network and/or an identity in the unmanned aerial system. For example, the identity of the first terminal device includes an identity of the first terminal device in the network and/or an identity of the first terminal device in the unmanned aerial system. The identity of the second terminal device includes an identity of the second terminal device in the network and/or an identity of the second terminal device in the unmanned aerial system.

For example, the identity of the first terminal device in the unmanned aerial system may include a product serial number of the first terminal device, a certificate serial number of the first terminal device, a public key of the first terminal device, a physical address of the first terminal device, an internet protocol (IP) address of the first terminal device, a media access control (MAC) address of the first terminal device, or a session address of the first terminal device. This is not limited in this application. The product serial number of the first terminal device may be code used when a vendor produces the first terminal device. The code is mainly used for production process control, production quality management, material inventory tracking, a product after-sales service, copyright control, and the like. The product serial number may also comply with a specific standard specification, for example, the small unmanned aerial systems serial numbers standard ANSI CTA-2063-A formulated by the American National Standards Institute (ANSI). The standard specification is not limited in this embodiment of this application. Similarly, the identity of the second terminal device in the unmanned aerial system may include a product serial number of the second terminal device, a certificate serial number of the second terminal device, a public key of the second terminal device, a physical address of the second terminal device, an IP address of the second terminal device, a MAC address of the second terminal device, a session address of the second terminal device, or the like. This is not limited in this application. It may be understood that the serial number shown above may also be referred to as an identifier or the like.

For example, the identity of the first terminal device in the network may have different forms in different network elements or network functions. For example, when the first terminal device sends the first message to a second network device, the identity of the first terminal device may be a globally unique temporary UE identity (GUTI) or a subscription concealed identifier (SUCI). When receiving the first message, the second network device may convert the GUTI or the SUCI of the first terminal device into a SUPI of the first terminal device. Similarly, the identity of the second terminal device in the network may also have different forms in different network elements or network functions. It may be understood that for specific descriptions of the identity of the second terminal device, refer to the descriptions of the identity of the first terminal device. Details are not described herein again.

It may be understood that the foregoing enumerated identities are merely examples, and should not be construed as a limitation on this embodiment of this application.

In this embodiment of this application, in a process in which the first terminal device sends the first message to the first network device, for example, the first message may be sent to the first network device through the second network device in an access network or a core network. For another example, the first message may alternatively be sent to the first network device through an access network and another network device (for example, a UPF). A network element or a network function that the first message may pass through in the process of sending the first message may be determined according to a policy in the mobile communication network, may be determined according to a standard protocol, or the like. This is not limited in this application.

In this embodiment of this application, after the first message is sent from the first terminal device, when the first message passes through different network elements or network functions, the first message may have different forms. For example, when the first message passes through the second network device, the second network device may re-encapsulate the first message, for example, directly encapsulate the first message into an eleventh message, and then send the eleventh message to the first network device. Alternatively, the second network device may parse out the identity of the first terminal device and the identity of the second terminal device from the first message, encapsulate the identity of the first terminal device and the identity of the second terminal device into a twelfth message, and then send the twelfth message to the first network device. Therefore, the process of sending the first message is not limited in this embodiment of this application. Optionally, the first message may be sent by using a non-access stratum (NAS) message (a signaling plane or a data plane) or an access stratum (AS) message (a data plane). Optionally, encryption or integrity protection may be further performed on the first message. How to perform encryption or integrity protection on the first message is not limited in this embodiment of this application.

302. The first network device verifies the pairing relationship between the first terminal device and the second terminal device based on the identity of the first terminal device and the identity of the second terminal device.

In an implementation of this embodiment of this application, the first network device may verify the pairing relationship between the first terminal device and the second terminal device based on a digital signature. In another implementation of this embodiment of this application, the first network device may verify the pairing relationship between the first terminal device and the second terminal device based on a subscriber identity module (SIM) card.

A method used by the first network device to verify the pairing relationship between the first terminal device and the second terminal device based on the digital signature is as follows:

In this embodiment of this application, the first message further includes a digital signature of the pairing relationship between the first terminal device and the second terminal device. For example, the digital signature may be a mathematical method or a mathematical algorithm, and is used to verify authenticity and integrity of a message, software, an electronic document, or the like. However, in this embodiment of this application, the digital signature may be used to verify authenticity, integrity, or the like of the pairing relationship between the first terminal device and the second terminal device. In other words, the digital signature in this embodiment of this application is not merely a digital signature of the first terminal device or a digital signature of the second terminal device, but the digital signature of the pairing relationship between the first terminal device and the second terminal device.

In a possible implementation, the first network device may verify the digital signature based on a first public key; or the first network device may verify the digital signature based on the identity of the first terminal device, the identity of the second terminal device, and a first public key. The first public key is a public key pre-stored in the first network device. For example, the first public key may be a public key (V-Pubkey) provided by a vendor, a service provider, another vertical industry, or the like, and therefore is stored in the first network device. For example, the vendor or the service provider may sign a contract with a network operator before using the mobile communication network. When the contract is signed, the vendor or the service provider may provide the first public key for the operator. The operator may input or copy the first public key into the first network device. It may be understood that there may be one or more first public keys provided by the vendor or the service provider for the operator. It may be understood that how to generate the first public key and how to input the first public key into the first network device are not limited in this embodiment of this application.

For example, if a pairing relationship between the unmanned aerial vehicle and the controller is determined by the vendor, and a customer that signs a contract with the network operator is also the vendor, the vendor may directly send a first public key (or a certificate) of the vendor to the first network device. Alternatively, if a pairing relationship between the unmanned aerial vehicle and the controller is determined by the vendor, and a customer that signs a contract with the network operator is the service provider (or the vertical industry), the service provider (or the vertical industry) may send a first public key (or a certificate) of the service provider (or the vertical industry) and a first public key (or a certificate) of the vendor signed by the service provider (or the vertical industry) to the first network device. Alternatively, if a pairing relationship between the unmanned aerial vehicle and the controller is determined by the service provider (or the vertical industry), and a customer that signs a contract with the network operator is also the service provider (or the vertical industry), the service provider (or the vertical industry) may send a first public key (or a certificate) of the service provider (or the vertical industry) to the first network device.

For different representation forms of the pairing relationship between the first terminal device and the second terminal device, this embodiment of this application further provides the following five implementations.

Implementation 1

In a possible implementation, the first message includes a credential of the first terminal device, and the pairing relationship between the first terminal device and the second terminal device is included in the credential of the first terminal device. The credential includes any one or more of a certificate or a token.

In this embodiment of this application, when the first message includes the credential of the first terminal device, the credential of the first terminal device may include the digital signature and the pairing relationship between the first terminal device and the second terminal device. In other words, that the first network device verifies the digital signature based on the identity of the first terminal device, the identity of the second terminal device, and the first public key may be understood as that the first network device verifies the credential of the first terminal device based on the first public key, where the credential of the first terminal device includes the digital signature and the pairing relationship between the first terminal device and the second terminal device. In other words, the digital signature of the pairing relationship between the first terminal device and the second terminal device may be understood as a digital signature of the credential of the first terminal device, and the credential of the first terminal device includes the digital signature and the pairing relationship between the first terminal device and the second terminal device.

For example, when the credential of the first terminal device includes a certificate of the first terminal device, the certificate of the first terminal device may include the identity of the first terminal device, the identity of the second terminal device that is paired with the first terminal device, and a digital signature (Vsig) of the certificate of the first terminal device. The identity of the first terminal device may include any one or more of the certificate serial number of the first terminal device, the product serial number of the first terminal device, the public key of the first terminal device, the IP address of the first terminal device, the MAC address of the first terminal device, or the like. The identity of the second terminal device may include any one or more of the public key of the second terminal device, the certificate serial number of the second terminal device, the product serial number of the second terminal device, the IP address of the second terminal device, the MAC address of the second terminal device, or the like. For example, if there are two second terminal devices paired with the first terminal device, the first message may include certificate serial numbers of the two second terminal devices. It may be understood that, when there are a plurality of second terminal devices paired with the first terminal device, whether identities of the plurality of second terminal devices are identities of a same type is not limited in this embodiment of this application. For example, the first message may include a certificate serial number of the 1st second terminal device paired with the first terminal device and a public key of the 2nd second terminal device paired with the first terminal device.

Optionally, the certificate of the first terminal device may further include an identifier of the first public key. The identifier of the first public key may be used to enable the first network device to determine the first public key for verifying the digital signature from one or more stored first public keys. For the implementation 1, the vendor or the service provider (or the vertical industry) may preset, in the first terminal device, a certificate issued for the first terminal device. Therefore, when the first terminal device needs to access the mobile communication network to communicate with the second terminal device, the first terminal device may directly send the certificate of the first terminal device to the first network device by using the first message.

For example, a format of an X.509 certificate is used as an example, and partial content of the certificate may be that shown as follows:

Partial content of the certificate of the first terminal device is as follows:
  serial number: 10:ea:1c: . . . : indicates a certificate serial number of the first terminal device;
  X509v3 extensions: indicates a newly added item in the certificate of the first terminal device;
  X509v3 Paired devices: indicates a certificate serial number of a second terminal device that is paired with the first terminal device;
  Critical: indicates that the pairing relationship is a necessary parameter;
  00:da:1c: . . . : indicates a certificate serial number of a second terminal device that is paired with the first terminal device; and
  00:1c:2d: . . . : indicates a certificate serial number of a second terminal device that is paired with the first terminal device.

Partial content of the certificate of the second terminal device is as follows:
  serial number: 00:da:1c: . . . : indicates a certificate serial number of the second terminal device;
  X509v3 extensions: indicates a newly added item in the certificate of the second terminal device;
  X509v3 Paired devices: indicates a certificate serial number of a first terminal device that is paired with the second terminal device;
  Critical: indicates that the pairing relationship is a necessary parameter;
  10:ea:1c: . . . : indicates a certificate serial number of the first terminal device that is paired with the second terminal device; and
  00:11:dd: . . . : indicates a certificate serial number of another terminal device that is paired with the second terminal device.

The newly added item (extensions) in the foregoing certificate clearly indicates pairing information of the first terminal device and the second terminal device. The "critical" parameter indicates that the pairing relationship needs to be met. Optionally, if the unmanned aerial system or the network does not require that the pairing relationship needs to be met, the certificate does not include the parameter. The certificate of the first terminal device is used as an example. A number following "critical" indicates a certificate serial number, a public key, an address, an ID, another identity, or the like of the second terminal device that is paired with the first terminal device. It may be understood that, in the certificate example shown above, the pairing relationship is indicated by the certificate serial number (serial number). For example, the certificate serial number of the first terminal device is 10:ea:1c: . . . , and the certificate serial number of the second terminal device is 00:da:1c: . . . . However, the certificate serial numbers shown above are merely examples. In the certificate serial numbers shown in this embodiment of this application, the last several digits in the certificate serial numbers are omitted. During actual application, the certificate serial number may be expressed in more manners. This is not limited in this application.

In addition, the certificate of the first terminal device also indicates that the certificate serial number of the another second terminal device that is paired with the first terminal device is 00:1c:2d: . . . . For example, if the first terminal device is an unmanned aerial vehicle, and the second terminal device is a controller, the unmanned aerial vehicle may be controlled by two controllers. For another example, if the first terminal device is a controller, and the second terminal device is an unmanned aerial vehicle, the controller may control two unmanned aerial vehicles. In addition, the certificate of the second terminal device also indicates that the certificate serial number of the another terminal device that is paired with the second terminal device is 00:11:dd: . . . .

For example, when the credential includes a token (token), the token may include the identity of the first terminal device, the identity of the second terminal device that is paired with the first terminal device, or a digital signature of the token. It may be understood that, for descriptions of the identity of the first terminal device and the identity of the second terminal device, refer to the descriptions in the implementation 1. Details are not described herein again. It may be understood that the token in this embodiment of this application may also be referred to as a security token or the like.

The following uses a JWT token (JSON Web Tokens or JSONWeb Token) as an example to describe the token. For example, the JWT token may include at least a header part, a payload part, and a digital signature part. The header part may be used to indicate a type of the JWT token and a used security algorithm. The payload part may include a claim of the JWT token. The digital signature part includes a digital signature of an issuer of the JWT token. It should be noted that another type of token may alternatively be used in this embodiment of this application. It may be understood that the issuer of the JWT token may be a vendor, a service provider, a vertical industry entity, or the like. This is not limited in this application.

For example, the pairing relationship between the first terminal device and the second terminal device may be written into the payload part as the claim of the JWT token, and partial content in the JWT token may be that shown as follows:

---

{... (Other claims are omitted)
"sub":"uav": indicates that the first terminal device is an unmanned aerial vehicle;

"sn":"08WU...": indicates a product serial number of the first terminal device;
"prd":"08QU...", "0ASD...": indicates a list of product serial numbers of two second terminal devices that are paired with the first terminal device;
... (Other claims are omitted)
}

A claim item (claims) in the JWT token is used to indicate pairing information of the first terminal device and the second terminal device. It may be understood that, in the partial content included in the JWT token shown above, the identity of the first terminal device and the identity of the second terminal device are shown as product serial numbers. For example, the product serial number of the first terminal device is 08WU . . . , and the product serial number of the second terminal device that is paired with the first terminal device is "08QU . . . " or "0ASD . . . ". However, in this embodiment of this application, other identifiers may alternatively be used to indicate the identities of the first terminal device and the second terminal device. It can be further learned from the partial content in the JWT token shown above that the first terminal device is an unmanned aerial vehicle, the second terminal device is a controller, and the unmanned aerial vehicle may be controlled by two controllers.

It should be noted that the foregoing claim item "sn" or "prd", claim content "uav", or the like is merely an example, and may alternatively be replaced with another claim item, content, or the like. This is not limited in this application.

For the implementation 1, the certificate or the token sent by the first terminal device includes both the identities of the first terminal device and the second terminal device that have the pairing relationship, that is, the identity of the paired second terminal device is indicated in the newly added item in the certificate or the claim item in the token. This avoids using a plurality of certificates or a plurality of tokens to indicate the identities of the first terminal device and the second terminal device that have the pairing relationship, to effectively reduce signaling overheads. In addition, the first message includes the digital signature of the certificate of the first terminal device, and the first network device may verify the digital signature by using the first public key. This ensures that the pairing relationship between the first terminal device and the second terminal device is not tampered with, to improve security of the pairing relationship between the first terminal device and the second terminal device.

Implementation 2

In a possible implementation, the first message includes a credential of the first terminal device and a credential of the second terminal device, and the credential of the first terminal device and the credential of the second terminal device are used to indicate the pairing relationship between the first terminal device and the second terminal device. In other words, the first message may include both the credential of the first terminal device and the credential of the second terminal device that have the pairing relationship. The credential includes any one or more of a certificate, a token, or a public key.

In this embodiment of this application, when the first message includes the credential of the first terminal device and the credential of the second terminal device, that the first network device verifies the digital signature based on the identity of the first terminal device, the identity of the second terminal device, and the first public key may be understood as that the first network device verifies the credential of the first terminal device and the credential of the second terminal device based on the first public key. In other words, the digital signature of the pairing relationship between the first terminal device and the second terminal device may be understood as a digital signature of the credential of the first terminal device and the credential of the second terminal device.

For example, when the credential includes the certificate, the first message may include a certificate of the first terminal device and a certificate of the second terminal device. It may be understood that, in the implementation 2, the certificate of the first terminal device and the certificate of the second terminal device may not include the newly added item shown in the implementation 1. Optionally, the certificate of the first terminal device may include an identifier of a first public key, and the certificate of the second terminal device may also include an identifier of a first public key, whether the identifier of the first public key included in the certificate of the first terminal device is the same as the identifier of the first public key included in the certificate of the second terminal device is not limited in this embodiment of this application. In other words, there are one or more first public keys, and the first public key for verifying the digital signature of the credential of the first terminal device may be the same as or different from the first public key for verifying the digital signature of the credential of the second terminal device. This is not limited in this embodiment of this application.

For example, a format of an X.509 certificate is used as an example, and partial content of the certificate may be that shown as follows:

Partial content of the certificate of the first terminal device is as follows:
  Certificate (UAV): indicates that the first terminal device is an unmanned aerial vehicle;
  . . . (Partial content is omitted);
  Serial Number: 10:ea: 1c: . . . : indicates a certificate serial number of the first terminal device;
  . . . (Partial content is omitted);
  Public Key: 00:c1:11:19: . . . : indicates a public key of the first terminal device;
  . . . (Partial content is omitted).
Partial content of the certificate of the second terminal device is as follows:
  Certificate (UAV Controller): indicates that the second terminal device is a controller;
  . . . (Partial content is omitted);
  Serial Number: 00:da:1c: . . . : indicates a certificate serial number of the second terminal device;
  . . . (Partial content is omitted);
  Public Key: 00:dd:31:2e: . . . : indicates a public key of the second terminal device;
  . . . (Partial content is omitted).
Relative to the implementation 1, the first message includes both the certificate of the first terminal device and the certificate of the second terminal device, so that the first network device can learn of the pairing relationship between the first terminal device and the second terminal device based on the first message. In addition, modification of a certificate type or format of the first terminal device or the second terminal device is avoided, and an implementation is simple. Further, the first network device verifies the digital signature of the certificate of the first terminal device and the digital signature of the certificate of the second terminal device based on the first public key. This prevents another device from modifying or tampering with the pairing relationship, and ensures security of the pairing relationship between the first terminal device and the second terminal device.

For example, when the credential includes the token, the first message may include a token of the first terminal device and a token of the second terminal device. Further, the token of the first terminal device may include the identity of the first terminal device and/or a digital signature of the token of the first terminal device. The token of the second terminal device may include the identity of the second terminal device and/or a digital signature of the token of the second terminal device. It may be understood that for more descriptions of the token, refer to the implementation 1. Details are not described herein again.

For example, partial content in a JWT token may be that shown as follows:

Partial content in the token of the first terminal device is as follows:

second terminal device, and content of the credential of the first terminal device and content of the credential of the second terminal device are partially the same.

In this embodiment of this application, partial content may be content pre-agreed on by the first terminal device and the second terminal device. For example, a key, a passphrase, a verification code, or the like included in the credential of the first terminal device may be the same as a key, a passphrase, a verification code, or the like included in the credential of the second terminal device. For another example, a pairing identifier included in the credential of the first terminal device is the same as a pairing identifier included in the credential of the second terminal device. In other words, regardless of a type of the credential, the key, the passphrase, the verification code, the pairing identifier, or the like included in the credential of the first terminal device is the same as the key, the passphrase, the verification code, the pairing identifier, or the like included in the credential of the second terminal device.

Further, the first message further includes a digital signature, so that the first network device may verify the digital signature based on a first public key. For the implementation 3, whether the digital signature is included in the credential is not limited in this embodiment of this application. In addition, the first message further includes the identity of the first terminal device and the identity of the second terminal device. In other words, whether the credential of the first terminal device includes the identity of the first terminal device and/or the identity of the second terminal device is {... (Other claims are omitted)
"sub":"uav": indicates that the first terminal device is an unmanned aerial vehicle;
"sn":"08WU...": indicates a product serial number of the first terminal device;
... (Other claims are omitted)}.
Partial content in the token of the second terminal device is as follows:
{... (Other claims are omitted)
"sub":"uav controller": indicates that the second terminal device is a controller;
"sn":"08QU...": indicates a product serial number of the second terminal device;
... (Other claims are omitted)}.
Partial content in the token of the second terminal device is as follows:
{... (Other claims are omitted)
"sub":"uav controller": indicates that the second terminal device is a controller;
"sn":"0ASD...": indicates a product serial number of the second terminal device;
... (Other claims are omitted)}.

It may be understood that for related descriptions of the token in the implementation 2, refer to the descriptions of the token in the implementation 1. Details are not described herein again.

For example, when the credential includes the public key, the first message may include a public key of the first terminal device, a public key of the second terminal device, and the digital signature.

For example, when the credential includes an identity of a terminal device in the unmanned aerial system, the first message may include the identity of the first terminal device, the identity of the second terminal device, and the digital signature. The identity is an identity in the unmanned aerial system.

It should be understood that, in this embodiment of this application, the credential may include or not include the digital signature based on different types. The type may include the certificate, the token, the public key, or the like.

Implementation 3

In a possible implementation, the first message includes a credential of the first terminal device or a credential of the not limited in this embodiment of this application. Whether the credential of the second terminal device includes the identity of the first terminal device and/or the identity of the second terminal device is not limited in this embodiment of this application. In addition, the first message may further include an identifier of the first public key, and the identifier of the first public key may be used to enable the first network device to determine the first public key for verifying the digital signature from one or more stored first public keys.

In this embodiment of this application, that the first network device verifies the digital signature based on the identity of the first terminal device, the identity of the second terminal device, and the first public key may be understood as that the first network device verifies the digital signature based on the first public key, and the credential of the first terminal device or the credential of the second terminal device indicates the pairing relationship between the first terminal device and the second terminal device.

Implementation 4

In a possible implementation, the first message includes an identifier of a credential of the first terminal device or an identifier of a credential of the second terminal device, and the identifier of the credential of the first terminal device is the same as the identifier of the credential of the second terminal device.

In the implementation 4, the first message may include the identity of the first terminal device and/or the identity of the second terminal device, a digital signature, and an identifier. It may be understood that the first message may further include an identifier of a first public key, so that the first network device learns of a specific first public key for verifying the identifier of the credential of the first terminal device or the identifier of the credential of the second terminal device. The identifier of the first public key may be used to enable the first network device to determine the first public key for verifying the digital signature from one or more stored first public keys. It may be understood that a specific form of the identifier of the credential is not limited in this embodiment of this application.

For the implementation 3 and the implementation 4, after the first network device successfully verifies the digital signature based on the first public key, the first network device may perform a pairing process by using a same part in the credential.

Implementation 5

In a possible implementation, the first message includes an identifier of a credential of the first terminal device and an identifier of a credential of the second terminal device, and the identifier of the credential of the first terminal device and the identifier of the credential of the second terminal device are used to indicate the pairing relationship between the first terminal device and the second terminal device.

In this embodiment of this application, that the first network device verifies the digital signature based on the identity of the first terminal device, the identity of the second terminal device, and the first public key may be understood as that the first network device verifies the identifier of the credential of the first terminal device and the identifier of the credential of the second terminal device based on the first public key. In other words, the digital signature of the pairing relationship between the first terminal device and the second terminal device may be understood as a digital signature of the identifier of the credential of the first terminal device and the identifier of the credential of the second terminal device.

For specific descriptions of the implementation 5, refer to the implementation 4 or the implementation 3. Details are not described herein again.

It may be understood that, that the first network device verifies the digital signature based on the identity of the first terminal device, the identity of the second terminal device, and the first public key described in this embodiment of this application may alternatively be replaced with the following: The first network device verifies the digital signature based on the first public key.

A method used by the first network device to verify the pairing relationship between the first terminal device and the second terminal device based on a subscriber identity module (SIM) card is as follows:

In a possible implementation, the first message may not include the digital signature, the identity of the first terminal device includes a subscriber identity SUPI or GPSI of the first terminal device in the network, and the identity of the second terminal device includes a subscriber identity SUPI or GPSI of the second terminal device in the network.

In this case, an operator may preconfigure, for the first network device, terminal device identities, such as SUPIs, of SIM cards that have a pairing relationship. Therefore, after the first network device receives the first message, the first network device may determine the pairing relationship between the first terminal device and the second terminal device based on the SUPI of the first terminal device and/or the SUPI of the second terminal device.

In this implementation, the first terminal device and the second terminal device access the mobile communication network by using the SIM cards (the SUPIs or the GPSIs). The implementation is simple, and a pairing manner of the first terminal device and the second terminal device is more flexible.

303. After the verification on the pairing relationship between the first terminal device and the second terminal device succeeds, the first network device sends a second message to the first terminal device, where the second message includes first indication information, and the first indication information is used to indicate a pairing result of the first terminal device and the second terminal device.

For a process in which the first network device sends the second message to the first terminal device, refer to the process of sending the first message. Details are not described herein again.

In this embodiment of this application, the first indication information may be used to indicate the pairing result of the first terminal device and the second terminal device, and the pairing result may include a pairing success result of the first terminal device and the second terminal device, or may include a pairing failure result of the first terminal device and the second terminal device. It may be understood that a specific form or type of the first message and/or a specific form or type of the second message are/is not limited in this embodiment of this application.

In a possible implementation, when the first message shown above is carried in a registration request message, the second message may be carried in a registration response message. In other words, when the registration response message includes the first indication information, and the first indication information indicates the pairing success result, the first indication information may be further used to indicate that a registration request of the first terminal device succeeds. Alternatively, when the first indication information indicates the pairing failure result, the first indication information may be further used to indicate that a registration request of the first terminal device fails.

In a possible implementation, after the first network device successfully verifies the pairing relationship between the first terminal device and the second terminal device, the first network device may further pair the first terminal device with the second terminal device. The pairing process is as follows:

The first network device searches whether the first network device stores a context of the second terminal device. If the first network device does not find the context of the second terminal device, it indicates that the second terminal device has not accessed the mobile communication network, or it indicates that the second terminal device has not been successfully paired with the first terminal device. In this case, the first network device may store the identity of the first terminal device and the identity of the second terminal device. The first network device waits for the second terminal device to access the mobile communication network, or the first network device may further send a notification message to the first terminal device, or the like. Optionally, the notification message may be used to notify that the second terminal device has not accessed the mobile communication network. Further, after the second terminal device accesses the mobile communication network, for example, after the second terminal device sends the first message to the first network device, and the first network device successfully verifies the pairing relationship between the first terminal device and the second terminal device based on the first message, the first network device may store information such as the identity of the first terminal device into the context of the second terminal device, and store information such as the identity of the second terminal device into a context of the first terminal device.

If the first network device finds the context of the second terminal device, it indicates that the second terminal device has accessed the mobile communication network, or it indicates that the second terminal device also needs to be paired with the first terminal device. In this case, the first network device may store information such as the identity of the second terminal device into a context of the first terminal device, and store information such as the identity of the first terminal device into the context of the second terminal device.

Optionally, in addition to storing the identity of the first terminal device into the context of the second terminal device, the first network device may further store the context of the first terminal device into the context of the second terminal device. In addition to storing the identity of the second terminal device into the context of the first terminal device, the first network device may further store the context of the second terminal device into the context of the first terminal device.

It may be understood that the pairing process is also applicable to the following embodiments.

Optionally, for the implementation 3 and the implementation 4, the first network device may perform the pairing process based on the same part in the credential. For example, if keys of the first terminal device and the second terminal device are the same, the information such as the identity of the first terminal device may be stored into the context of the second terminal device, and the information such as the identity of the second terminal device may be stored into the context of the first terminal device.

In a possible implementation, the method shown in FIG. 3 further includes the following steps.

304. The first network device sends a third message to the second network device, where the third message includes the identity of the first terminal device and the identity of the second terminal device, and the identity of the first terminal device and the identity of the second terminal device are used to indicate that the first terminal device and the second terminal device have the pairing relationship. Correspondingly, the second network device receives the third message.

In this embodiment of this application, after the first network device successfully verifies the pairing relationship between the first terminal device and the second terminal device, the first network device sends the third message to the second network device, so that the second network device can store the identity of the first terminal device and the identity of the second terminal device that have the pairing relationship. Therefore, when the first terminal device and/or the second terminal device need/needs to access the mobile communication network subsequently and perform pairing, the first terminal device and/or the second terminal device may directly send a fourth message to the second network device, where the fourth message may be used to request to access the mobile communication network, and/or the fourth message may be used to request pairing.

305. The first terminal device sends the fourth message to the second network device. Correspondingly, the second network device receives the fourth message from the first terminal device, where the fourth message includes the identity of the first terminal device and/or the identity of the second terminal device that is paired with the first terminal device.

306. The second network device verifies the pairing relationship between the first terminal device and the second terminal device.

In this embodiment of this application, the first network device has sent, to the second network device, the identity of the first terminal device and the identity of the second terminal device that have the pairing relationship. Therefore, after receiving the fourth message, the second network device may determine, based on the identity in the fourth message, whether the first terminal device and the second terminal device have the pairing relationship.

Optionally, the pairing relationship between the first terminal device and the second terminal device stored in the second network device may have a specific validity period. In this case, the first network device may periodically send the third message to the second network device, or the first network device may send the third message to the second network device when the pairing relationship between the first terminal device and the second terminal device changes, or the like. This is not limited in this embodiment of this application.

307. After the verification on the pairing relationship between the first terminal device and the second terminal device succeeds, the second network device sends a fifth message to the first terminal device, where the fifth message includes second indication information, and the second indication information is used to indicate the pairing result of the first terminal device and the second terminal device.

It may be understood that for the fifth message and the second indication information, refer to the second message and the first indication information that are shown above. Details are not described herein again.

It should be noted that the terminal device in this embodiment of this application may alternatively be another type of terminal. For example, when the first terminal device is an unmanned aerial vehicle, the second terminal may be an inspection device or another third party authorization entity (TPAE). These devices may be authorized to remotely control and communicate with the first device (the unmanned aerial vehicle).

In this embodiment of this application, only after the first network device successfully verifies the pairing relationship between the first terminal device and the second terminal device, the first network device authorizes the first terminal device to use a mobile network device to control the second terminal device. Therefore, in one aspect, an unauthorized first terminal device is prevented from randomly controlling the second terminal device, to improve security of pairing the first terminal device with the second terminal device. In another aspect, impact on use of another terminal device due to access of any terminal device to the mobile communication network is avoided, to effectively ensure security and reliability of accessing the mobile communication network by the first terminal device and the second terminal device.

It may be understood that the terminal device verification method shown in FIG. 3 is also applicable to the second terminal device. In this application, the steps of the method shown in FIG. 3 are performed by the second terminal device. Details are not described again.

For more vivid understanding of the method shown in FIG. 3 provided in embodiments of this application, the following uses an example in which a first terminal device is an unmanned aerial vehicle, a second terminal device is a controller, a first network device is a UTM, a second network device is an AMF, and a third network device is a UDM to describe in more detail the terminal device verification method provided in embodiments of this application. It may be understood that in the following embodiments, an example in which a credential is a certificate is used for description. In addition, for the following embodiments, the UTM may be deployed inside an operator network, or may be deployed outside an operator network. This is not limited in embodiments of this application.

Figure 4A:
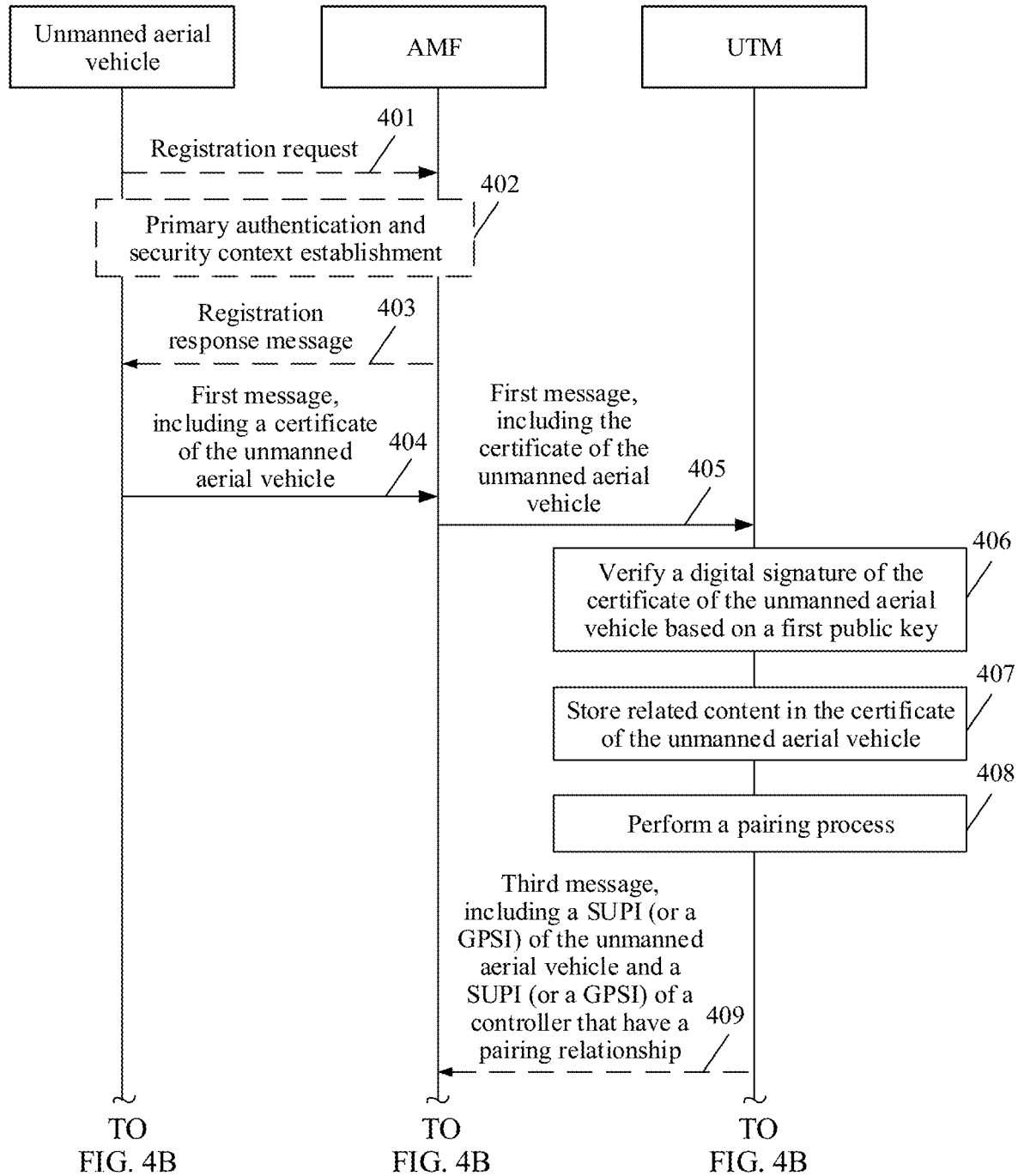
FIG. 4A and FIG. 4B are a schematic flowchart of a terminal device verification method, according to an embodiment of this application.
Figure 4B:
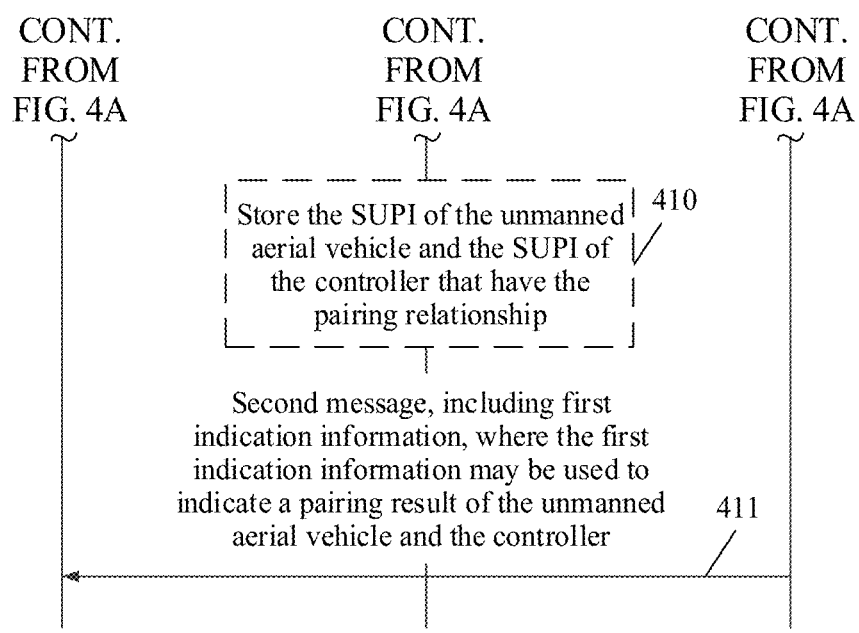

FIG. 4A and FIG. 4B are a schematic flowchart of a terminal device verification method according to an embodiment of this application. According to the terminal device verification method shown in FIG. 3, this embodiment of this application may be roughly divided into two phases. A first phase is a phase in which a certificate is preset (including a pairing relationship), and a second phase is to register the certificate with a network.

In the first phase, if a vendor or a service provider presets certificates for an unmanned aerial vehicle and a controller, that is, the vendor or the service provider may store the certificate issued for the unmanned aerial vehicle into an unmanned aerial vehicle device, and store the certificate issued for the controller into the controller. For example, the certificate of the unmanned aerial vehicle may include a public key of the unmanned aerial vehicle (namely, an identity of the unmanned aerial vehicle), a public key list of the paired unmanned aerial vehicle and the paired controller (namely, identities of the unmanned aerial vehicle and the controller that have a pairing relationship), and a digital signature of the vendor or the service provider for the certificate of the unmanned aerial vehicle. It may be understood that the public key list shown above is merely an example. In a specific implementation, the public key list may be alternatively understood as a name such as a public key set or an identifier (ID) list. This is not limited in this embodiment of this application.

In addition, the vendor or the service provider may further configure a first public key (V-pubkey) for the unmanned aerial vehicle or the controller, and store the first public key into a UTM.

As shown in FIG. 4A and FIG. 4B, the terminal device verification method includes the following steps.

In a possible implementation, the method shown in FIG. 4A and FIG. 4B may include step 401 to step 403.

401. The unmanned aerial vehicle sends a registration request to a network. For example, the unmanned aerial vehicle sends the registration request to an AMF through an access network device.

402. Primary authentication is performed between the unmanned aerial vehicle and the network to establish a security context.

403. The network sends a registration response message to the unmanned aerial vehicle. For example, the AMF sends a registration accept (registration accept) message to the unmanned aerial vehicle.

For example, a person skilled in the art may obtain an authentication process between the unmanned aerial vehicle and the network with reference to related standards or protocol materials. A specific implementation of step 401 to step 403 is not limited in this embodiment of this application. It may be understood that a network element or a network function used in the primary authentication procedure between the unmanned aerial vehicle and the network shown in FIG. 4A and FIG. 4B is merely an example, and the network function or the network element that is shown should not be understood as a limitation on this embodiment of this application.

404. The unmanned aerial vehicle sends a first message to the AMF, where the first message includes the certificate of the unmanned aerial vehicle. Correspondingly, the AMF receives the first message.

For example, the certificate of the unmanned aerial vehicle includes the public key (UAV pub key) of the unmanned aerial vehicle, the public key list or the ID list (paired control pub key/ID list) of the unmanned aerial vehicle and the controller, and the digital signature (vsig) of the vendor or the service provider for the certificate of the unmanned aerial vehicle.

It may be understood that for a specific form of the certificate, refer to the method shown in FIG. 3. Details are not described herein again.

405. The AMF sends the first message to the UTM. Correspondingly, the UTM receives the first message.

Optionally, the first message may further include an identity of the unmanned aerial vehicle in the network, for example, a SUPI of the unmanned aerial vehicle. It may be understood that when the UTM is deployed inside a core network, after receiving a GUTI of the unmanned aerial vehicle, the AMF may convert the GUTI of the unmanned aerial vehicle into the SUPI of the unmanned aerial vehicle. When the UTM is deployed outside a core network (an operator network), after receiving a GUTI of the unmanned aerial vehicle, the AMF may convert the GUTI of the unmanned aerial vehicle into a generic public subscription identifier (GPSI) of the unmanned aerial vehicle.

406. The UTM verifies, based on the first public key (V-pubkey), whether the digital signature of the certificate of the unmanned aerial vehicle is valid. If the digital signature of the certificate of the unmanned aerial vehicle is valid, step 407 is performed. If the digital signature of the certificate of the unmanned aerial vehicle is not valid, the UTM may send a failure message (not shown in FIG. 4A and FIG. 4B) to the unmanned aerial vehicle.

That the UTM verifies whether the digital signature of the certificate of the unmanned aerial vehicle is valid may be understood as that the UTM verifies a digital signature of the pairing relationship between the unmanned aerial vehicle and the controller.

A method used by the UTM to verify whether the digital signature is valid is not limited in this embodiment of this application.

It may be understood that after the UTM sends the failure message to the unmanned aerial vehicle, the unmanned aerial vehicle may further re-initiate the registration request, or the unmanned aerial vehicle may further re-send the first message, or the like.

In a possible implementation, step 404 may be alternatively replaced with the following: The unmanned aerial vehicle sends a first message to the AMF, where the first message includes the certificate of the unmanned aerial vehicle and the certificate of the controller. Correspondingly, the AMF receives the first message. For example, the certificate of the unmanned aerial vehicle includes the public key of the unmanned aerial vehicle, and the digital signature of the vendor or the service provider for the certificate of the unmanned aerial vehicle. The certificate of the controller includes the public key of the controller, and a digital signature of the vendor or the service provider for the certificate of the controller.

In this case, step 406 may be alternatively replaced with the following: The UTM verifies, based on the first public key, whether the digital signature of the certificate of the unmanned aerial vehicle and the digital signature of the certificate of the controller that have the pairing relationship are valid. If both the digital signature of the certificate of the unmanned aerial vehicle and the digital signature of the certificate of the controller are valid, step 407 is performed. If either the digital signature of the certificate of the unmanned aerial vehicle or the digital signature of the certificate of the controller is not valid or both the digital signature of the certificate of the unmanned aerial vehicle and the digital signature of the certificate of the controller are not valid, the UTM sends a failure message to the unmanned aerial vehicle.

It may be understood that how to encapsulate the certificate of the unmanned aerial vehicle and the certificate of the controller into the first message is not limited in this embodiment of this application. In other words, a sequence of placing the certificate of the unmanned aerial vehicle and the certificate of the controller in the first message is not limited in this embodiment of this application. Optionally, assuming that one unmanned aerial vehicle is paired with a plurality of controllers, a certificate of the unmanned aerial vehicle may be first placed in the first message, and then certificates of the plurality of controllers are sequentially placed in the first message; or certificates of the plurality of controllers may be first sequentially placed in the first message, and then a certificate of the unmanned aerial vehicle is placed in the first message, or the like.

407. The UTM stores related content in the certificate of the unmanned aerial vehicle, for example, the public key of the unmanned aerial vehicle, the SUPI of the unmanned aerial vehicle, and the public key list of the paired unmanned aerial vehicle and the paired controller.

408. The UTM searches whether the UTM has stored a context of the controller paired with the unmanned aerial vehicle. If the UTM has stored the context of the controller paired with the unmanned aerial vehicle, the UTM pairs the unmanned aerial vehicle with the controller. A pairing process of the unmanned aerial vehicle and the controller is as follows: The UTM stores information such as the identity of the unmanned aerial vehicle into the context of the controller, and the UTM stores information such as the identity of the controller into a context of the unmanned aerial vehicle.

If the UTM does not store the context of the controller paired with the unmanned aerial vehicle, the UTM waits for the controller to access the mobile communication network. After the controller accesses the mobile communication network, the UTM pairs the unmanned aerial vehicle with the controller.

It may be understood that the pairing process shown in step 408 is replaced with the pairing process performed by the UTM in FIG. 4A and FIG. 4B. For how the UTM performs the pairing process, refer to the descriptions in FIG. 3 or step 408 in FIG. 4A and FIG. 4B.

In a possible implementation, the method shown in FIG. 4A and FIG. 4B may further include step 409 and step 410.

409. The UTM sends a third message to the AMF, where the third message includes the SUPI (or the GPSI) of the unmanned aerial vehicle and a SUPI (or a GPSI) of the controller that have the pairing relationship. Correspondingly, the AMF receives the third message. Optionally, if the AMF receives the GPSI, the AMF converts the GPSI into the SUPI.

Optionally, the UTM may further send the third message to a UDM. After receiving the third message, the UDM stores the SUPI of the unmanned aerial vehicle and the SUPI of the controller that have the pairing relationship.

Optionally, the UTM may further send the third message to the AMF. After receiving the third message, the AMF may further send the third message to the UDM.

Optionally, the UTM may further send the third message to the UDM. After receiving the third message, the UDM may further send the third message to the AMF.

410. The AMF stores the SUPI of the unmanned aerial vehicle and the SUPI of the controller that have the pairing relationship.

For example, the AMF may store the SUPI pair of the unmanned aerial vehicle and the controller that have the pairing relationship into the context of the unmanned aerial vehicle and the context of the controller respectively.

Alternatively, 410 may be replaced with the following: The AMF may further store the GUTI pair of the unmanned aerial vehicle and the controller that have the pairing relationship into the context of the unmanned aerial vehicle and the context of the controller respectively.

411. The UTM sends a second message to the unmanned aerial vehicle, where the second message includes first indication information, and the first indication information may be used to indicate a pairing result of the unmanned aerial vehicle and the controller. Correspondingly, the unmanned aerial vehicle receives the second message.

Optionally, the UTM may send the second message to the AMF, and the AMF sends the second message to the unmanned aerial vehicle.

Optionally, for a process in which the UTM sends the second message to the unmanned aerial vehicle, refer to the method shown in FIG. 3. Details are not described herein again.

In a possible implementation, the first message may be carried in the registration request, and the second message may be carried in the registration response message. That is, the foregoing step 404 and the foregoing step 401 may be combined into one step. The foregoing step 403 and the foregoing step 411 may be combined into one step. For example, when the unmanned aerial vehicle sends the registration request to the network, the registration request may include the first message. Then, primary authentication is performed between the unmanned aerial vehicle and the network to establish the security context. Then, the UTM performs step 406 and the like. After the UTM performs the pairing process, the UTM sends the second message to the AMF, and then the AMF sends the registration response message to the unmanned aerial vehicle, where the registration response message includes the second message. It may be understood that the descriptions are also applicable to the following embodiment.

According to the method shown in FIG. 4A and FIG. 4B, the unmanned aerial vehicle and the controller may transmit data to each other. However, the unmanned aerial vehicle and the controller may not always maintain a communication state. For example, the communication state between the unmanned aerial vehicle and the controller may be disconnected. When the unmanned aerial vehicle and/or the controller need/needs to re-access the mobile communication network, the unmanned aerial vehicle may not send the certificate to the UTM. For example, the unmanned aerial vehicle may send a fourth message to the AMF, where the fourth message includes the identity of the unmanned aerial vehicle and/or the identity of the controller. After receiving the fourth message, the AMF may verify the pairing relationship between the unmanned aerial vehicle and the controller based on the stored pairing relationship (for example, a SUPI list or a GUTI list). After the AMF successfully verifies the pairing relationship between the unmanned aerial vehicle and the controller, the AMF sends a fifth message to the unmanned aerial vehicle, where the fifth message includes second indication information. It may be understood that for a specific implementation method of the second indication information, refer to the first indication information. Details are not described herein again.

It may be understood that the certificate of the unmanned aerial vehicle and/or the certificate of the controller may be updated. After the certificate of the unmanned aerial vehicle and/or the certificate of the controller are/is updated by the vendor or the service provider, the unmanned aerial vehicle may further directly send an updated certificate of the unmanned aerial vehicle to the network. Therefore, the network may further update, store, or the like the certificate of the unmanned aerial vehicle according to the method shown in FIG. 4A and FIG. 4B.

In this embodiment of this application, the first terminal device may send the first message to enable the first network device to verify the pairing relationship. After the verification succeeds, the pairing relationship is automatically stored in the first network device, and may continue to be used before the pairing relationship is updated. In this manner, a mobile communication network administrator does not configure and store the pairing relationship between the first device and the second device, and the pairing relationship can be automatically registered with the network. In addition, after the verification on the pairing relationship succeeds, the first terminal device may access the mobile communication network, to implement communication with the second terminal device. In other words, in this embodiment of this application, only the authenticated controller and the authenticated unmanned aerial vehicle can be authorized to use the mobile communication network to perform operating, remote control, communication, and the like of the unmanned aerial vehicle. Therefore, in a beyond visual line-of-sight scenario with a high security requirement, the network can limit and authorize use of the unmanned aerial vehicle or the controller, to improve use security of the unmanned aerial vehicle or the controller.

Figure 5:
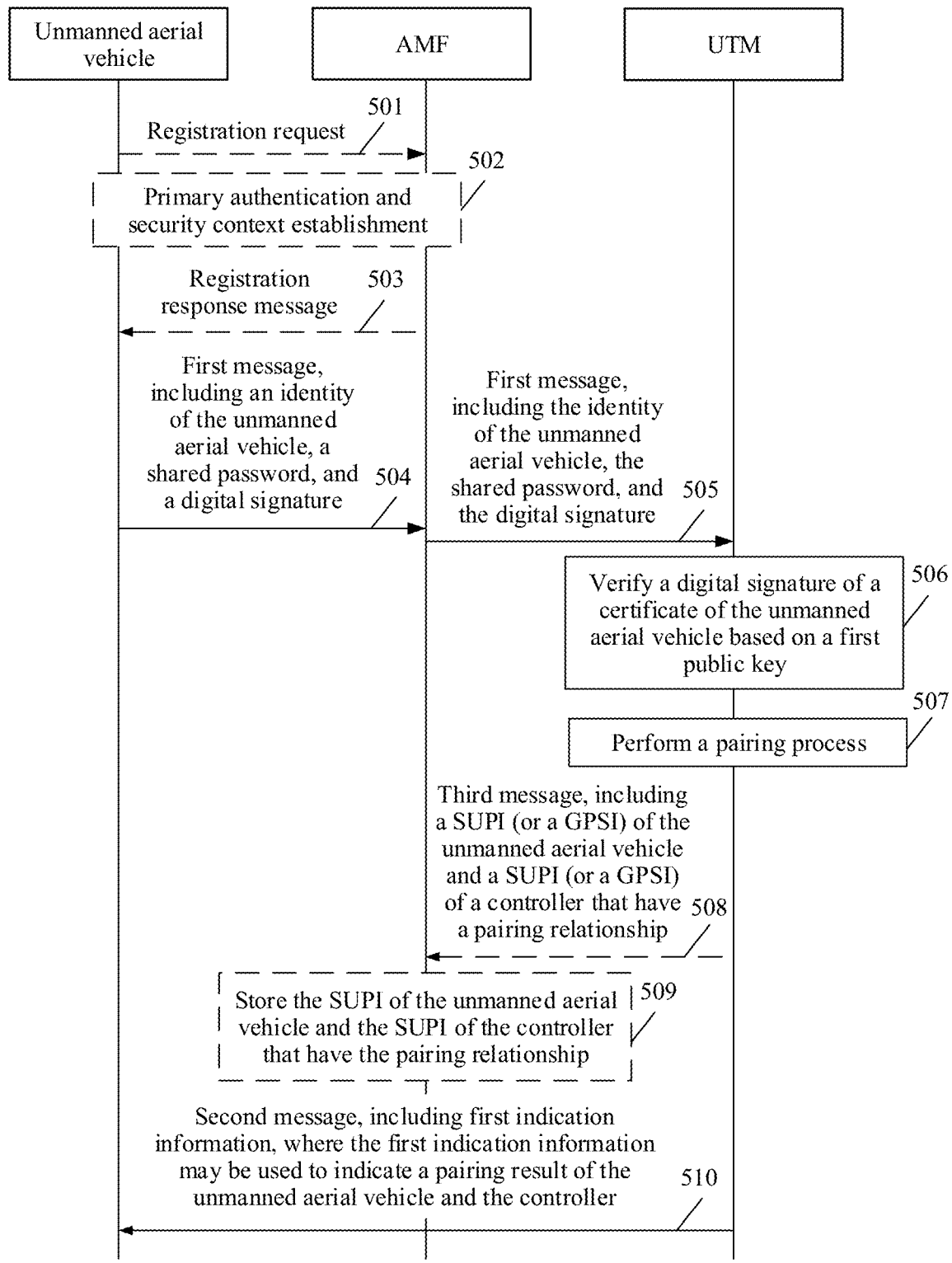
FIG. 5 is a schematic flowchart of a terminal device verification method, according to an embodiment of this application.

FIG. 5 is a schematic flowchart of a terminal device verification method according to an embodiment of this application. According to the method shown in FIG. 3, this embodiment of this application may still be divided into two phases. In a first phase, a vendor or a service provider presets a symmetric key or a shared password for an unmanned aerial vehicle and a controller, and a related device (for example, a UTM or an AMF) may determine a pairing relationship between the unmanned aerial vehicle and the controller based on the symmetric key or the shared password. For example, the vendor or the service provider may preset a shared key ID, password ID, token ID, or the like for the unmanned aerial vehicle and the controller that have the pairing relationship, and then separately store the symmetric key or the shared key into the unmanned aerial vehicle and the controller. In addition, the vendor or the service provider may further configure a first public key (V-pubkey) for a network, and the first public key is stored into the UTM.

It may be understood that the symmetric/shared key, the shared password, or the like in this embodiment of this application may be understood as the password, the passphrase, the verification code, or the like in the implementation 3, or the identifier of the credential or the like in the implementation 4.

As shown in FIG. 5, the terminal device verification method includes the following steps.

501. The unmanned aerial vehicle sends a registration request to the network. For example, the unmanned aerial vehicle sends the registration request to the AMF through an access network device.

502. Primary authentication is performed between the unmanned aerial vehicle and the network to establish a security context.

503. The network sends a registration response message to the unmanned aerial vehicle. For example, the AMF sends a registration accept message to the unmanned aerial vehicle.

For example, a person skilled in the art may obtain an authentication process between the unmanned aerial vehicle and the network with reference to related standards or protocol materials. A specific implementation of step 501 to step 503 is not limited in this embodiment of this application.

504. The unmanned aerial vehicle sends a first message to the AMF, where the first message includes an identity, the shared password, and a digital signature of the unmanned aerial vehicle. Correspondingly, the AMF receives the first message.

505. The AMF sends the first message to the UTM. Correspondingly, the UTM receives the first message.

506. The UTM verifies, based on the first public key (V-pubkey), whether the digital signature of the unmanned aerial vehicle is valid. If the digital signature is valid, step 507 is performed. If the digital signature is not valid, the UTM may send a failure message (not shown in FIG. 5) to the unmanned aerial vehicle.

507. The UTM searches, based on the shared password, whether the UTM has stored a context of the controller paired with the unmanned aerial vehicle. If the UTM has stored the context of the controller paired with the unmanned aerial vehicle (with the same shared password), the UTM pairs the unmanned aerial vehicle with the controller. A pairing process of the unmanned aerial vehicle and the controller is as follows: The UTM stores the identity of the unmanned aerial vehicle into the context of the controller, and the UTM stores an identity of the controller into a context of the unmanned aerial vehicle.

If the UTM does not store the context of the controller paired with the unmanned aerial vehicle, the UTM waits for the controller to access the mobile communication network. After the controller accesses the mobile communication network, the UTM pairs the unmanned aerial vehicle with the controller.

In a possible implementation, the method shown in FIG. 5 may further include step 508 and step 509.

508. The UTM sends a third message to the AMF, where the third message includes a SUPI of the unmanned aerial vehicle and a SUPI of the controller that have a pairing relationship. Correspondingly, the AMF receives the third message.

509. The AMF stores the SUPI of the unmanned aerial vehicle and the SUPI of the controller that have the pairing relationship.

510. The UTM sends a second message to the unmanned aerial vehicle, where the second message includes first indication information, and the first indication information may be used to indicate a pairing result of the unmanned aerial vehicle and the controller. Correspondingly, the unmanned aerial vehicle receives the second message.

It may be understood that, for the method shown in FIG. 5, refer to the method shown in FIG. 4A and FIG. 4B. For example, for step 508, refer to related descriptions of step 409. For another example, for step 509, refer to step 410. Details are not described herein again.

Figure 6:
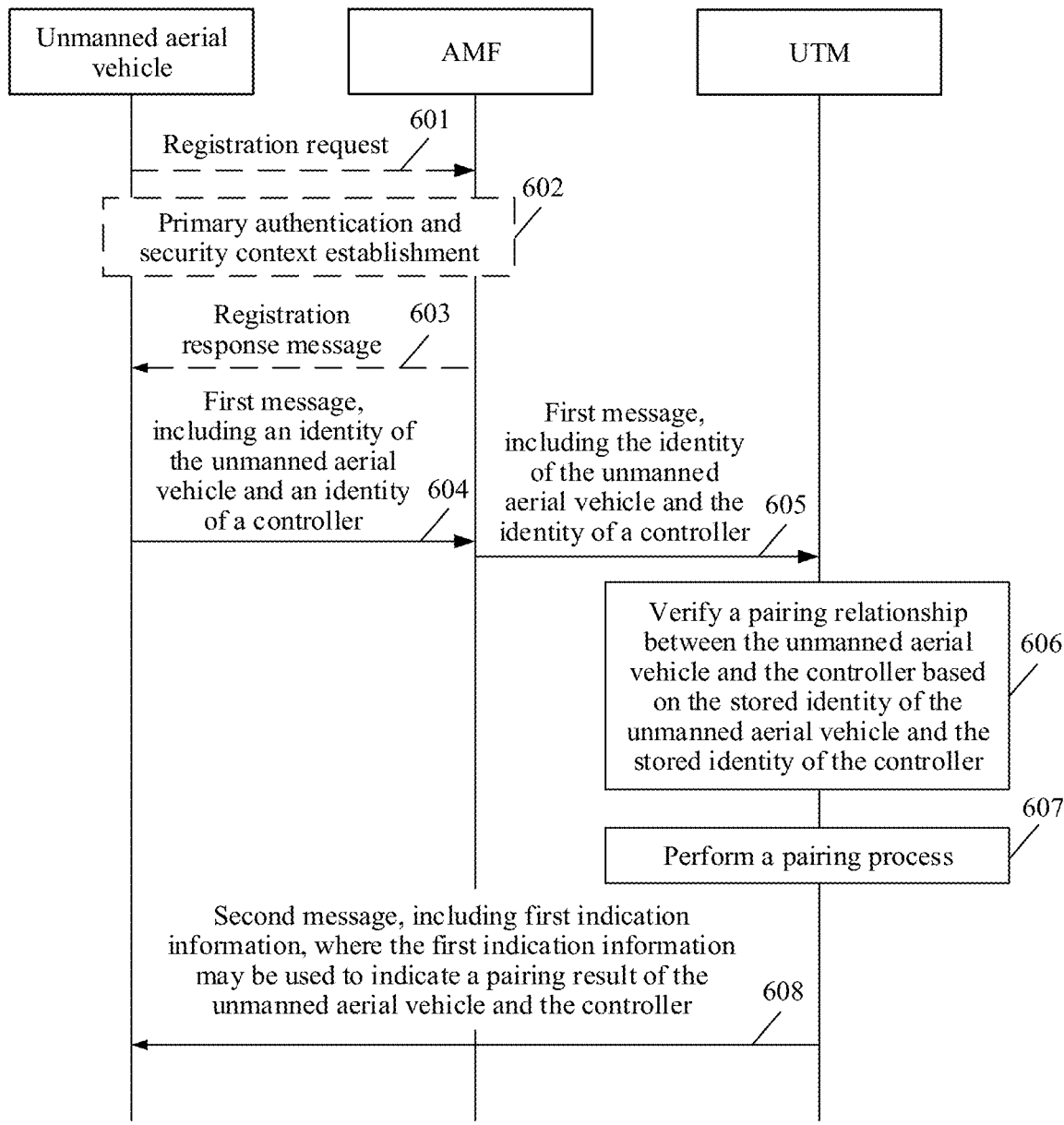
FIG. 6 is a schematic flowchart of a terminal device verification method, according to an embodiment of this application.

FIG. 6 is a schematic flowchart of a terminal device verification method according to an embodiment of this application. In this embodiment of this application, a network operator participates in setting a pairing relationship between an unmanned aerial vehicle and a controller. This embodiment of this application may still be divided into two phases. In a first phase, the network operator may set SIM cards having a pairing relationship. For example, identities of the SIM cards having the pairing relationship may include a SUPI 1 and a SUPI 2. Provided that the SIM cards having the pairing relationship are used, it may be determined that the unmanned aerial vehicle and the controller have the pairing relationship.

Further, the identities of the SIM cards having the pairing relationship may be stored into a network, for example, may be stored into a UDM or a UTM. For another example, the identities of the SIM cards having the pairing relationship may be stored into the UDM, and the UDM may send the identities of the SIM cards having the pairing relationship to the UTM, so that the UTM stores the identities of the SIM cards having the pairing relationship. For another example, the identities of the SIM cards having the pairing relationship may be directly stored into the UTM. It may be understood that the UTM may be deployed inside the network, or may be deployed outside the network. If the UTM is deployed outside the network, a GPSI instead of the SUPI may be used as an identity of the pairing relationship.

As shown in FIG. 6, the terminal device verification method includes the following steps.

601. The unmanned aerial vehicle sends a registration request to the network. For example, the unmanned aerial vehicle sends the registration request to an AMF through an access network device.

602. Primary authentication is performed between the unmanned aerial vehicle and the network to establish a security context.

603. The network sends a registration accept message to the unmanned aerial vehicle. For example, the AMF sends the registration accept message to the unmanned aerial vehicle.

For example, a person skilled in the art may obtain an authentication process between the unmanned aerial vehicle and the network with reference to related standards or protocol materials. A specific implementation of step 601 to step 603 is not limited in this embodiment of this application.

604. The unmanned aerial vehicle sends a first message to the AMF, where the first message includes an identity of the unmanned aerial vehicle and an identity of the controller. Correspondingly, the AMF receives the first message.

605. The AMF sends the first message to the UTM. Correspondingly, the UTM receives the first message.

606. The UTM verifies the pairing relationship between the unmanned aerial vehicle and the controller based on the stored identity of the unmanned aerial vehicle and the stored identity of the controller. If the verification on the pairing relationship between the unmanned aerial vehicle and the controller succeeds, step 607 is performed. If the verification on the pairing relationship between the unmanned aerial vehicle and the controller fails, the UTM may send a failure message to the unmanned aerial vehicle (not shown in FIG. 6).

For example, the identity of the unmanned aerial vehicle includes a SUPI of the unmanned aerial vehicle, and the identity of the controller includes a SUPI of the controller.

607. The UTM searches whether the UTM has stored a context of the controller paired with the unmanned aerial vehicle. If the UTM has stored the context of the controller paired with the unmanned aerial vehicle, the UTM pairs the unmanned aerial vehicle with the controller. A pairing process of the unmanned aerial vehicle and the controller is as follows: The UTM stores information such as the identity of the unmanned aerial vehicle into the context of the controller, and the UTM stores information such as the identity of the controller into a context of the unmanned aerial vehicle.

If the UTM does not store the context of the controller paired with the unmanned aerial vehicle, the UTM waits for the controller to access the mobile communication network. After the controller accesses the mobile communication network, the UTM pairs the unmanned aerial vehicle with the controller.

608. The UTM sends a second message to the unmanned aerial vehicle, where the second message includes first indication information, and the first indication information may be used to indicate a pairing result of the unmanned aerial vehicle and the controller. Correspondingly, the unmanned aerial vehicle receives the second message.

In this embodiment of this application, the unmanned aerial vehicle and the controller access the mobile communication network by using SIM cards (SUPIs or GPSIs). The implementation is simple, and a pairing manner of the unmanned aerial vehicle and the controller is more flexible.

In a possible implementation, the method shown in FIG. 6 further includes the following step.

The UTM sends a third message to the AMF, where the third message includes the SUPI of the unmanned aerial vehicle and the SUPI of the controller that have the pairing relationship. Correspondingly, the AMF receives the third message.

The AMF stores the SUPI of the unmanned aerial vehicle and the SUPI of the controller that have the pairing relationship.

For the method shown in FIG. 6, further refer to the methods shown in FIG. 3 to FIG. 5. Details are not described herein again.

Figure 7A:
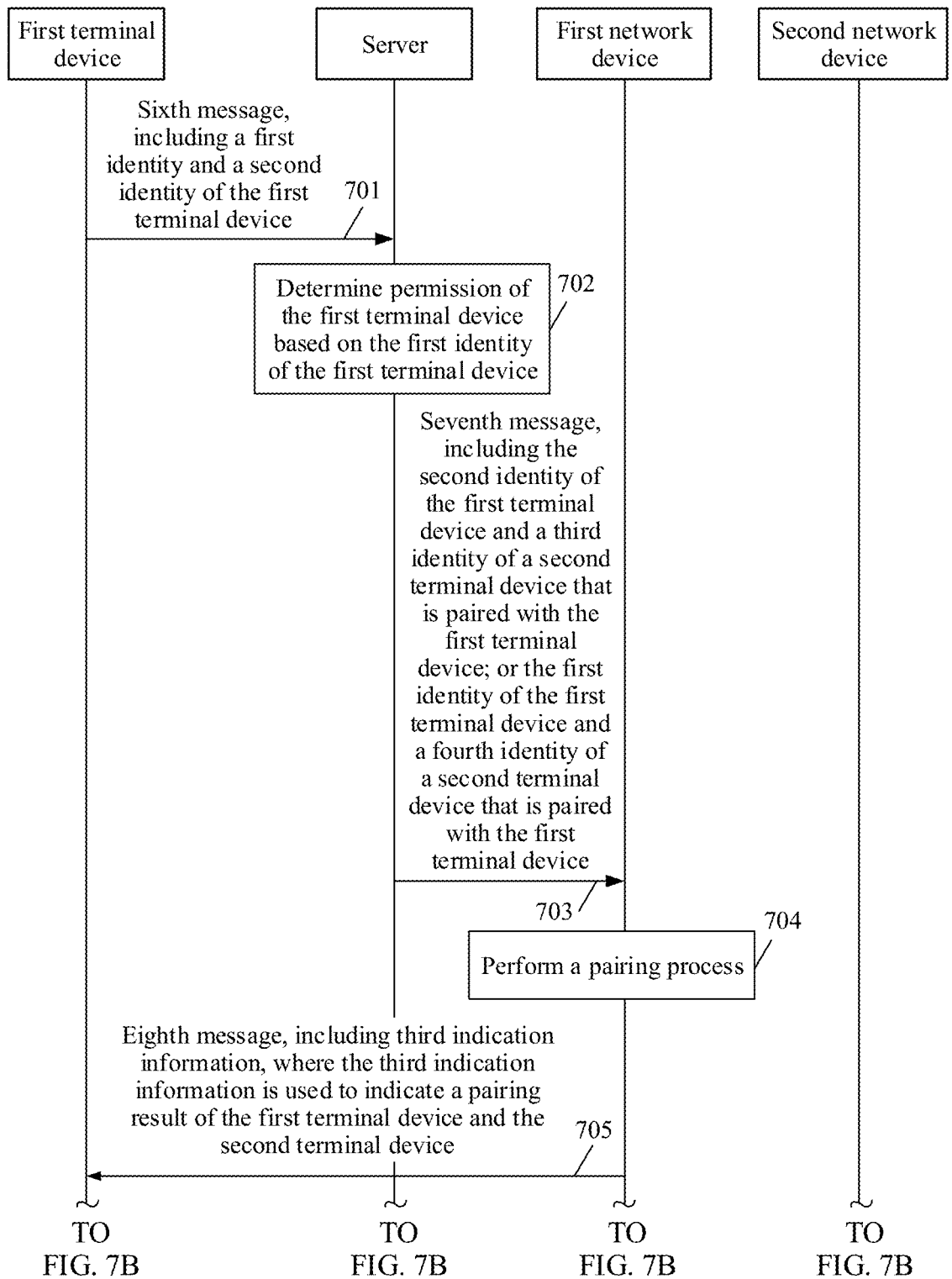
FIG. 7A and FIG. 7B are a schematic flowchart of a terminal device verification method, according to an embodiment of this application.
Figure 7B:
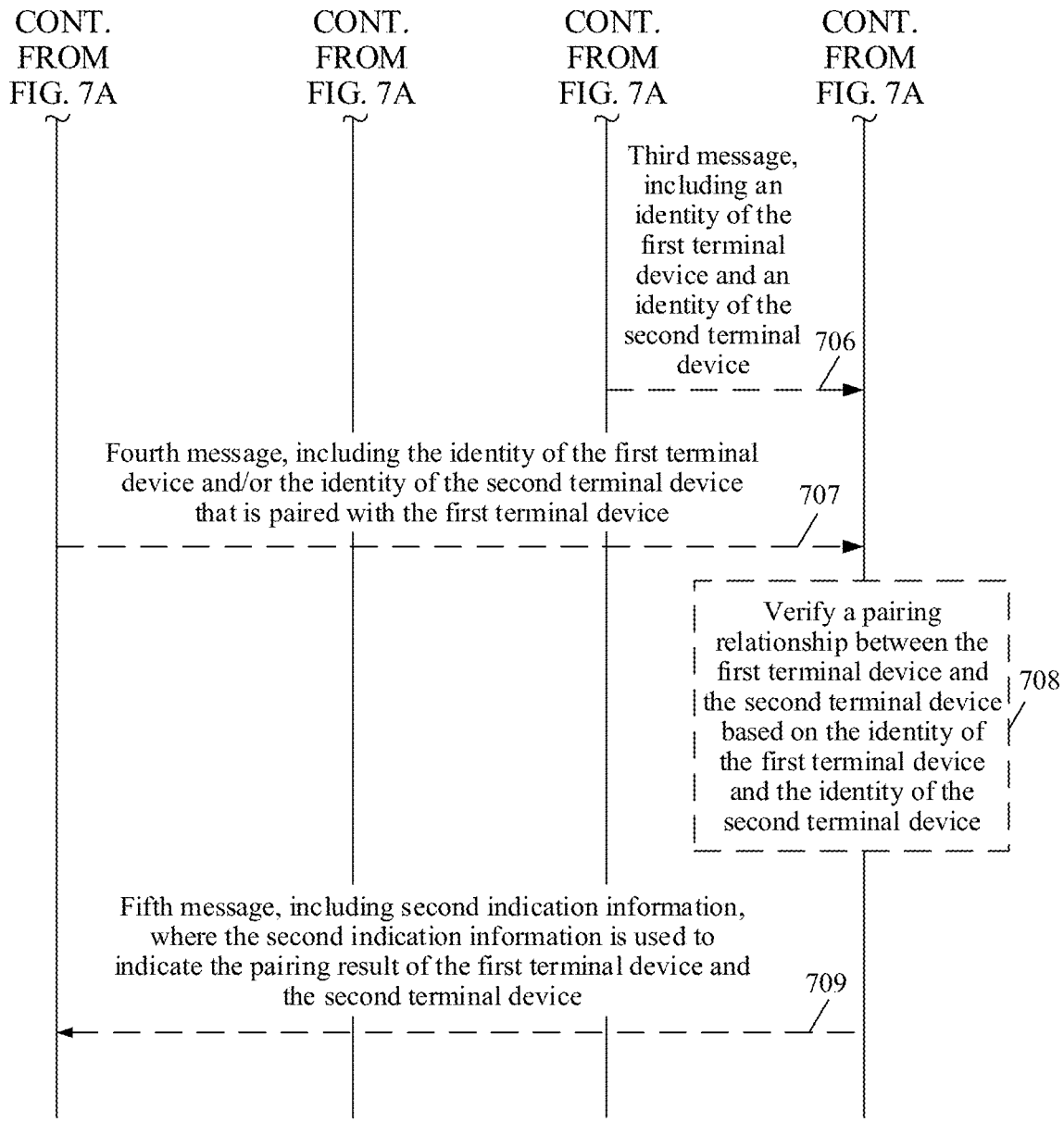

It may be understood that in the foregoing methods, a first network device is used as an example to describe how to verify a pairing relationship. An embodiment of this application further provides a terminal device verification method. In the terminal device verification method, a UTM and a server may verify a pairing relationship between a first terminal device and a second terminal device. As shown in FIG. 7A and FIG. 7B, the terminal device verification method includes the following steps.

701. The server receives a sixth message, where the sixth message includes a first identity and a second identity of the first terminal device.

In this embodiment of this application, the first identity is an identity of the first terminal device in an unmanned aerial system, and the second identity is an identity of the first terminal device in a network. For example, the identity of the first terminal device in the unmanned aerial system may be an ID of an unmanned aerial vehicle (UAV-ID) or an ID of a controller (UAV control-ID). For another example, the identity of the first terminal device in the network may be a GPSI of the unmanned aerial vehicle or a SUPI of the unmanned aerial vehicle; or the identity of the first terminal device in the network may be a GPSI of the controller or a SUPI of the controller.

In a possible implementation, that the server receives a sixth message may be understood as that the server receives the sixth message from the first terminal device. In this case, a process of sending the sixth message may be as follows: The first terminal device sends the sixth message to a second network device, where the sixth message may include the first identity of the first terminal device and the second identity of the first terminal device that are encapsulated into the sixth message. Then, after converting the second identity, the second network device sends the sixth message to the server. For example, when the second identity of the first terminal device includes a GUTI of the first terminal device, after receiving the sixth message, the second network device may convert the GUTI of the first terminal device into a GPSI, and send the sixth message to the server. It may be understood that FIG. 7A and FIG. 7B show that the server receives the sixth message from the first terminal device. However, the process of sending the sixth message is not limited in this application.

It may be understood that the process of sending the sixth message is not limited in this embodiment of this application. Regardless of the foregoing implementation, any implementation that can ensure that the sixth message received by the server includes the first identity and the second identity of the first terminal device falls within the protection scope of this application.

702. The server determines permission of the first terminal device based on the first identity of the first terminal device.

In this embodiment of this application, the server may pre-store a subscription relationship of the unmanned aerial system, and the like, so that the server can perform authentication, authorization, and the like based on the subscription relationship. Specifically, a vendor, a server provider, or the like may store the pairing relationship between the first terminal device and the second terminal device into the server. Therefore, after receiving the sixth message, the server may directly determine the permission of the first terminal device based on the stored pairing relationship. Optionally, that the server determines permission of the first terminal device may also be understood as that the server determines pairing permission of the first terminal device. If the permission of the first terminal device succeeds, it indicates that the first terminal device has the pairing permission. For example, the first terminal device may be paired with the second terminal device.

703. When the permission of the first terminal device succeeds, the server sends a seventh message to the first network device, where the seventh message includes the second identity of the first terminal device and a third identity of the second terminal device that is paired with the first terminal device, or the seventh message includes the first identity of the first terminal device and a fourth identity of the second terminal device that is paired with the first terminal device.

Correspondingly, the first network device receives the seventh message from the server.

In this embodiment of this application, the third identity is an identity of the second terminal device in the network, and the fourth identity is an identity of the second terminal device in the unmanned aerial system.

In this embodiment of this application, after an entity such as the vendor, the service provider, or a vertical industry determines the pairing relationship between the first terminal device and the second terminal device, the entity such as the vendor, the service provider, or the vertical industry may send the pairing identities of the first terminal device and the second terminal device to the server.

Further, the server may pre-store the second identity of the first terminal device and the third identity of the second terminal device that have a pairing relationship, or the server may pre-store the first identity of the first terminal device and the fourth identity of the second terminal device that have a pairing relationship. In other words, the server may store the identities of the first terminal device and the second terminal device that have the pairing relationship in the unmanned aerial system or the network.

Further, after receiving the sixth message, the server may obtain, based on the first identity of the first terminal device, a fourth identity, stored in the server, of one or more second terminal devices that are paired with the first terminal device, or obtain, based on the second identity of the first terminal device, a third identity, stored in the server, of one or more second terminal devices that are paired with the first terminal device.

It may be understood that for the pairing relationship between the first terminal device and the second terminal device, refer to the implementation shown in FIG. 3. Details are not described herein again.

In this embodiment of this application, the identity of the first terminal device in the network is distinguished from the identity of the first terminal device in the unmanned aerial system, so that privacy of the first terminal device in different devices can be effectively ensured, and security of storing the identity of the first terminal device is improved.

704. The first network device performs a pairing process on the first terminal device and the second terminal device based on the first identity of the first terminal device and the fourth identity of the second terminal device, or the second identity of the first terminal device and the third identity of the second terminal device.

In this embodiment of this application, the first network device may pair the first terminal device with the second terminal device based on the first identity of the first terminal device and the fourth identity of the second terminal device.

For the pairing process of the first terminal device and the second terminal device, refer to the pairing process shown in FIG. 3. Details are not described herein again.

705. The first network device sends an eighth message to the first terminal device, where the eighth message includes third indication information, and the third indication information is used to indicate a pairing result of the first terminal device and the second terminal device.

For implementations of the eighth message and the third indication information, refer to the second message and the first indication information shown in FIG. 3. Details are not described herein again.

In a possible implementation, as shown in FIG. 7A and FIG. 7B, the method shown in FIG. 7A and FIG. 7B may further include step 706 to step 709.

706. The first network device sends a third message to the second network device, where the third message includes an identity of the first terminal device and an identity of the second terminal device, and the identity of the first terminal device and the identity of the second terminal device are used to indicate that the first terminal device and the second terminal device have the pairing relationship. Correspondingly, the second network device receives the third message.

Optionally, the third message may include the second identity of the first terminal device and the third identity of the second terminal device.

707. The first terminal device sends a fourth message to the second network device. Correspondingly, the second network device receives the fourth message from the first terminal device, where the fourth message includes the identity of the first terminal device and/or the identity of the second terminal device that is paired with the first terminal device.

708. The second network device verifies the pairing relationship between the first terminal device and the second terminal device.

Optionally, the second network device may verify the pairing relationship between the second identity of the first terminal device and the third identity of the second terminal device.

709. After the verification on the pairing relationship between the first terminal device and the second terminal device succeeds, the second network device sends a fifth message to the first terminal device, where the fifth message includes second indication information, and the second indication information is used to indicate the pairing result of the first terminal device and the second terminal device.

For a specific implementation of step 706 to step 709, refer to step 304 to step 307 shown in FIG. 3. Details are not described herein again.

In this embodiment of this application, the server stores the pairing relationship between the first terminal device and the second terminal device (in other words, the server stores the identity of the first terminal device and the identity of the second terminal device), so that the server can determine the permission of the first terminal device based on the pairing relationship. Therefore, after the permission of the first terminal device succeeds, the server sends the seventh message to the first network device. In this application, any terminal device is prevented from accessing the network, and security of accessing the mobile communication network by the first terminal device is ensured. Further, the first network device sends the pairing relationship to the second network device. Therefore, when the first terminal device or the second terminal device subsequently needs to access the mobile communication network, the second network device can quickly determine the permission of the first terminal device or permission of the second terminal device, to improve efficiency of accessing the mobile communication network by the first terminal device or the second terminal device, and security of pairing the first terminal device with the second terminal device.

To vividly understand the method shown in FIG. 7A and FIG. 7B provided in embodiments of this application, the following more vividly describes a terminal device verification method provided in embodiments of this application by using an example in which a first terminal device is an unmanned aerial vehicle, a second terminal device is a controller, a first network device is a UTM, a second network device is an AMF, and a server is an AAA server.

Figure 8A:
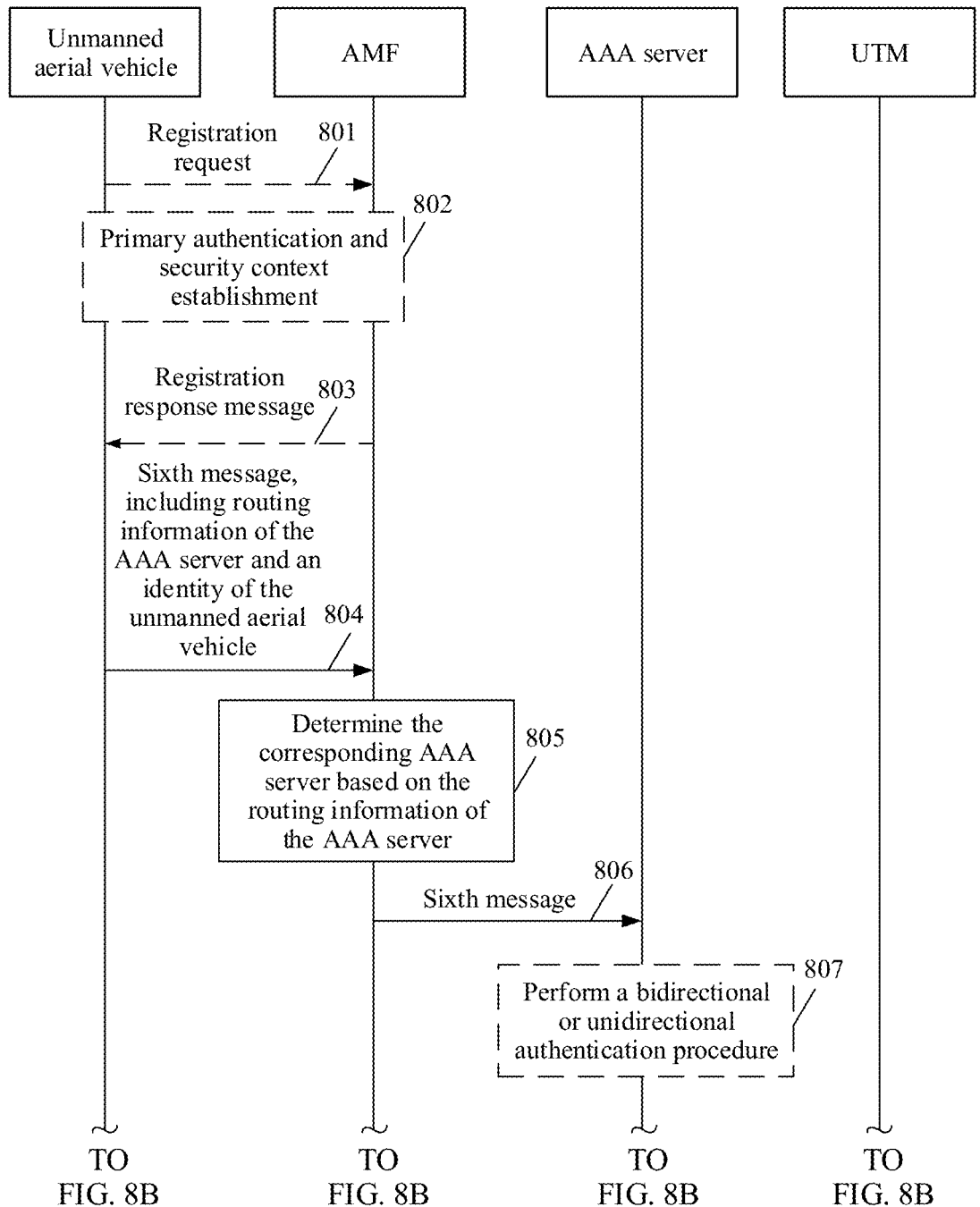
FIG. 8A and FIG. 8B are a schematic flowchart of a terminal device verification method, according to an embodiment of this application.
Figure 8B:
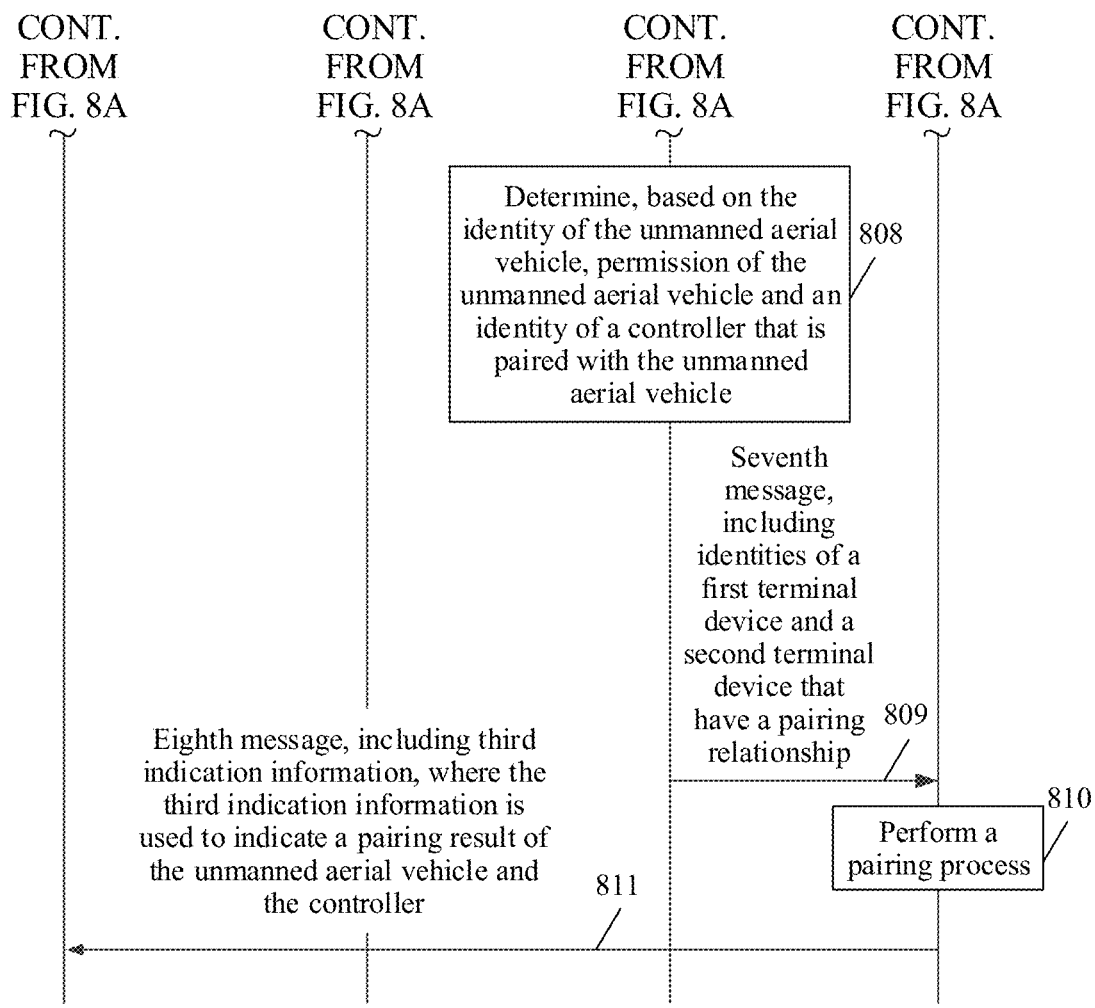

FIG. 8A and FIG. 8B are a schematic flowchart of a terminal device verification method according to an embodiment of this application. The terminal device verification method shown in FIG. 8A and FIG. 8B may be roughly divided into two phases. A first phase is an information configuration phase, and a second phase is a pairing phase. In the first phase of this embodiment of this application, a vendor or a service provider presets a certificate for an unmanned aerial vehicle and/or a certificate for a controller, that is, the vendor or the service provider may store the certificate issued for the unmanned aerial vehicle into an unmanned aerial vehicle device, and store the certificate issued for the controller into a controller device. For example, the certificate of the unmanned aerial vehicle may include a public key of the unmanned aerial vehicle, a public key list or an ID list of the paired unmanned aerial vehicle and the paired controller, and a digital signature of the vendor or the service provider for the certificate of the unmanned aerial vehicle. In addition, the vendor or the server further needs to configure routing information of an AAA server for the unmanned aerial vehicle and/or the controller. For example, the routing information of the AAA server may include an ID or an address of the AAA server. In addition, the vendor or the service provider configures the routing information of the AAA server in a network. For example, the routing information of the AAA server may be configured in a UDM and/or a UTM.

In other words, the AAA server stores identities of a first terminal device and a second terminal device that have a pairing relationship, and the UDM and/or the UTM store/stores the routing information of the AAA server.

As shown in FIG. 8A and FIG. 8B, the terminal device verification method includes the following steps.

In a possible implementation, the method shown in FIG. 8A and FIG. 8B may include step 801 to step 803.

801. The unmanned aerial vehicle sends a registration request to the network. For example, the unmanned aerial vehicle sends the registration request to an AMF through an access network device.

802. Primary authentication is performed between the unmanned aerial vehicle and the network to establish a security context.

803. The network sends a registration response message to the unmanned aerial vehicle. For example, the AMF sends a registration accept message to the unmanned aerial vehicle.

For example, a person skilled in the art may obtain an authentication process between the unmanned aerial vehicle and the network with reference to related standards or protocol materials. A specific implementation of step 801 to step 803 is not limited in this embodiment of this application.

804. The unmanned aerial vehicle sends a sixth message to the AMF, where the sixth message includes the routing information of the AAA server and an identity of the unmanned aerial vehicle. Correspondingly, the AMF receives the sixth message sent by the unmanned aerial vehicle.

It may be understood that, in this embodiment of this application, whether the sixth message includes a certificate, a token, or the like of the unmanned aerial vehicle is not limited.

805. The AMF determines the corresponding AAA server based on the routing information of the AAA server.

806. The AMF sends the sixth message to the determined AAA server. Correspondingly, the AAA server receives the sixth message.

In this embodiment of this application, when the AMF sends the sixth message to the AAA server, the identity of the unmanned aerial vehicle included in the sixth message may include a GPSI of the unmanned aerial vehicle.

In a possible implementation, the method shown in FIG. 8A and FIG. 8B may further include step 807.

807. A bidirectional or unidirectional authentication (or authorization) procedure is performed between the AAA server and the unmanned aerial vehicle.

For example, the authentication procedure may be an authentication procedure that is based on the extensible authentication protocol (extensible authentication protocol, EAP). This is not limited in this embodiment of this application.

808. The AAA server determines permission of the unmanned aerial vehicle based on the identity of the unmanned aerial vehicle. If the unmanned aerial vehicle can be authorized, the AAA server may determine, based on the identity of the unmanned aerial vehicle, an identity of the controller paired with the unmanned aerial vehicle.

In other words, step 808 may be as follows: The AAA server determines, based on the identity of the unmanned aerial vehicle, the permission of the unmanned aerial vehicle and the identity of the controller paired with the unmanned aerial vehicle.

809. The AAA server sends a seventh message to the UTM, where the seventh message includes the identities of the first terminal device and the second terminal device that have the pairing relationship. Correspondingly, the UTM receives the seventh message.

Optionally, the AAA server may directly send the seventh message to the UTM, or the AAA server may first send the seventh message to the AMF, and the AMF forwards the seventh message to the UTM.

810. The UTM searches whether the UTM has stored a context of the controller paired with the unmanned aerial vehicle. If the UTM has stored the context of the controller paired with the unmanned aerial vehicle, the UTM pairs the unmanned aerial vehicle with the controller. A pairing process of the unmanned aerial vehicle and the controller is as follows: The UTM stores information such as the identity of the unmanned aerial vehicle into the context of the controller, and the UTM stores information such as the identity of the controller into a context of the unmanned aerial vehicle.

If the UTM does not store the context of the controller paired with the unmanned aerial vehicle, the UTM waits for the controller to access the mobile communication network. After the controller accesses the mobile communication network, the UTM pairs the unmanned aerial vehicle with the controller.

811. The UTM sends an eighth message to the unmanned aerial vehicle, where the eighth message includes third indication information, and the third indication information is used to indicate a pairing result of the unmanned aerial vehicle and the controller. Correspondingly, the unmanned aerial vehicle receives the eighth message.

In a possible implementation, the method shown in FIG. 8A and FIG. 8B may further include the following step.

The UTM sends a third message to the AMF, where the third message includes a SUPI or the GPSI of the unmanned aerial vehicle and a SUPI or a GPSI of the controller that have a pairing relationship. Correspondingly, the AMF receives the third message.

The AMF stores the SUPI of the unmanned aerial vehicle and the SUPI of the controller that have the pairing relationship.

In a possible implementation, the method shown in FIG. 8A and FIG. 8B may further include the following step.

The unmanned aerial vehicle sends a fourth message to the AMF, where the fourth message includes the identity of the unmanned aerial vehicle and/or the identity of the controller. Correspondingly, the AMF receives the fourth message.

The AMF verifies the pairing relationship between the unmanned aerial vehicle and the controller, and after the verification succeeds, sends a fifth message to the unmanned aerial vehicle, where the fifth message includes second indication information.

It may be understood that the foregoing method is not shown in FIG. 8A and FIG. 8B. For specific descriptions of the foregoing method, refer to the methods shown in FIG. 3 to FIG. 7A and FIG. 7B. Details are not described herein again.

It may be understood that the method shown in FIG. 8A and FIG. 8B is described by using the unmanned aerial vehicle as an example, and this embodiment of this application is also applicable to the controller.

It may be understood that for specific descriptions of the terminal device verification method shown in FIG. 8A and FIG. 8B, refer to the methods shown in FIG. 3 to FIG. 7A and FIG. 7B. Details are not described herein again.

Optionally, in the foregoing embodiments, when a network element or a network function that is deployed or belongs to a network performs a related step based on an identity of a terminal device, the identity of the terminal device may be an identity in the network. When a device or an apparatus that is deployed outside the network or belongs to an unmanned aerial system performs a related step based on an identity of a terminal device, the identity of the terminal device may be an identity in the unmanned aerial system. Terminal devices include a first terminal device and a second terminal device. Alternatively, a related network element or network function may not distinguish between identities in the unmanned aerial system or the network.

It may be understood that the foregoing embodiments have their own emphasis. For an implementation that is not described in detail in one embodiment, refer to another embodiment. Details are not described herein again. Further, embodiments described in this specification may be independent solutions, or may be combined based on internal logic. These solutions all fall within the protection scope of this application.

The foregoing describes embodiments of this application in detail. The following describes a communication apparatus applicable to the terminal device verification method provided in this application.

Figure 9:
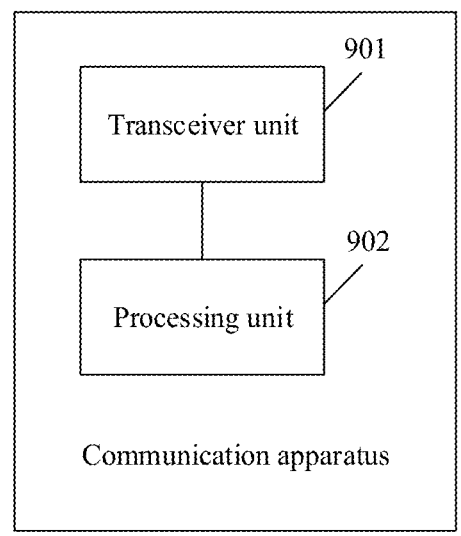
FIG. 9 is a schematic diagram of a structure of a communication apparatus, according to an embodiment of this application.

FIG. 9 is a schematic diagram of a structure of a communication apparatus according to an embodiment of this application. The communication apparatus may be configured to perform operations performed by the first network device in the foregoing method embodiments. For example, the communication apparatus may be configured to perform the operations performed by the first network device or the UTM in the method embodiments shown in FIG. 3 to FIG. 8A and FIG. 8B. As shown in FIG. 9, the communication apparatus includes a transceiver unit 901 and a processing unit 902.

The transceiver unit 901 is configured to receive a first message from a first terminal device, where the first message includes an identity of the first terminal device and/or an identity of a second terminal device that is paired with the first terminal device.

The processing unit 902 is configured to verify a pairing relationship between the first terminal device and the second terminal device based on the identity of the first terminal device and/or the identity of the second terminal device.

The transceiver unit 901 is configured to: after the verification on the pairing relationship between the first terminal device and the second terminal device succeeds, send a second message to the first terminal device, where the second message includes first indication information, and the first indication information is used to indicate a pairing result of the first terminal device and the second terminal device.

In a possible implementation, the processing unit 902 is further configured to store the identity of the first terminal device and the identity of the second terminal device.

In a possible implementation, the processing unit 902 is further configured to: store the identity of the second terminal device into a context of the first terminal device; and store the identity of the first terminal device into a context of the second terminal device.

In a possible implementation, the transceiver unit 901 is configured to send a third message to a second network device, where the third message includes the identity of the first terminal device and the identity of the second terminal device, and the identity of the first terminal device and the identity of the second terminal device are used to indicate that the first terminal device and the second terminal device have the pairing relationship.

For example, the transceiver unit 901 may be further configured to perform step 405 (perform a receiving operation), step 409 (perform a sending operation), or step 411 (perform a sending operation) in FIG. 4A and FIG. 4B. For another example, the transceiver unit 901 may be further configured to perform step 505, step 508, or step 510 in FIG. 5. For another example, the transceiver unit 901 may be further configured to perform step 605 and/or step 608 in FIG. 6. For another example, the transceiver unit 901 may be further configured to perform step 703 and/or step 705 in FIG. 7A and FIG. 7B. For another example, the transceiver unit 901 may be further configured to perform step 809 and/or step 811 in FIG. 8A and FIG. 8B. For example, the processing unit 902 may be configured to perform step 406 to step 408 in FIG. 4A and FIG. 4B. For another example, the processing unit 902 may be further configured to perform step 506 and/or step 507 in FIG. 5. For another example, the processing unit 902 may be further configured to perform step 606 and/or step 607 in FIG. 6. For another example, the processing unit 902 may be further configured to perform step 704 in FIG. 7A and FIG. 7B. For another example, the processing unit 902 may be further configured to perform step 810 in FIG. 8A and FIG. 8B.

It may be understood that the methods performed by the units shown above are merely examples. For specific steps performed by the units, refer to the methods shown in FIG. 3 to FIG. 8A and FIG. 8B.

It should be understood that when the communication apparatus is the first network device or a component that implements the foregoing functions in the first network device, the processing unit 902 may be one or more processors, and the transceiver unit 901 may be a transceiver; or the transceiver unit 901 may be a sending unit and a receiving unit, the sending unit may be a transmitter, the receiving unit may be a receiver, and the sending unit and the receiving unit are integrated into one component, for example, a transceiver.

When the communication apparatus is a chip, the processing unit 902 may be one or more processors, and the transceiver unit 901 may be an input/output interface, also referred to as a communication interface, an interface circuit, an interface, or the like; or the transceiver unit 901 may be a sending unit and a receiving unit, the sending unit may be an output interface, the receiving unit may be an input interface, and the sending unit and the receiving unit are integrated into one unit, for example, an input/output interface.

The communication apparatus in this embodiment of this application may perform any function performed by the first network device in the foregoing method embodiments. For specific steps and/or functions that may be performed, refer to detailed descriptions in the foregoing method embodiments. Only brief descriptions are provided herein, and details are not described again.

FIG. 9 is reused. FIG. 9 is a schematic diagram of a structure of a communication apparatus according to an embodiment of this application. The communication apparatus may be configured to perform operations performed by the second network device in the foregoing method embodiments. For example, the communication apparatus may be configured to perform the operations performed by the second network device or the AMF in the method embodiments shown in FIG. 3 to FIG. 8A and FIG. 8B. As shown in FIG. 9, the communication apparatus includes a transceiver unit 901 and a processing unit 902.

The transceiver unit 901 is configured to receive a fourth message from a first terminal device, where the fourth message includes an identity of the first terminal device and/or an identity of a second terminal device that is paired with the first terminal device.

The processing unit 902 is configured to verify a pairing relationship between the first terminal device and the second terminal device.

The transceiver unit 901 is configured to: after the verification on the pairing relationship between the first terminal device and the second terminal device succeeds, send a fifth message to the first terminal device, where the fifth message includes second indication information, and the second indication information is used to indicate a pairing result of the first terminal device and the second terminal device.

In a possible implementation, the transceiver unit 901 is further configured to receive a third message sent by a first network device, where the third message includes the identity of the first terminal device and the identity of the second terminal device, and the identity of the first terminal device and the identity of the second terminal device are used to indicate that the first terminal device and the second terminal device have the pairing relationship.

For example, the transceiver unit 901 may be further configured to perform step 401 (perform a receiving operation), step 403 (perform a sending operation), step 404 (perform a receiving operation), step 405 (perform a sending operation), or step 409 (perform a receiving operation) in FIG. 4A and FIG. 4B. For another example, the transceiver unit 901 may be further configured to perform step 501, step 503 to step 505, or step 508 in FIG. 5. For another example, the transceiver unit 901 may be further configured to perform step 601 or step 603 to step 605 in FIG. 6. For another example, the transceiver unit 901 may be further configured to perform step 706, step 707, or step 709 in FIG. 7A and FIG. 7B. For another example, the transceiver unit 901 may be further configured to perform step 801, step 803, step 804, or step 806 in FIG. 8A and FIG. 8B. For example, the processing unit 902 may be configured to perform step 410 in FIG. 4A and FIG. 4B. For another example, the processing unit 902 may be further configured to perform step 509 in FIG. 5. For another example, the processing unit 902 may be further configured to perform step 709 in FIG. 7A and FIG. 7B. For another example, the processing unit 902 may be further configured to perform step 805 in FIG. 8A and FIG. 8B.

It may be understood that the processing unit 902 and/or the transceiver unit 901 may also perform the step of performing primary authentication between an unmanned aerial vehicle and a network and establishing a security context.

It may be understood that for specific implementations of the transceiver unit 901 and the processing unit 902, refer to the methods shown in FIG. 3 to FIG. 8A and FIG. 8B.

It should be understood that when the communication apparatus is the second network device or a component that implements the foregoing functions in the second network device, the processing unit 902 may be one or more processors, and the transceiver unit 901 may be a transceiver; or the transceiver unit 901 may be a sending unit and a receiving unit, the sending unit may be a transmitter, the receiving unit may be a receiver, and the sending unit and the receiving unit are integrated into one component, for example, a transceiver.

When the communication apparatus is a chip, the processing unit 902 may be one or more processors, and the transceiver unit 901 may be an input/output interface, also referred to as a communication interface, an interface circuit, an interface, or the like; or the transceiver unit 901 may be a sending unit and a receiving unit, the sending unit may be an output interface, the receiving unit may be an input interface, and the sending unit and the receiving unit are integrated into one unit, for example, an input/output interface.

The communication apparatus in this embodiment of this application may perform any function performed by the second network device in the foregoing method embodiments. For specific steps and/or functions that may be performed, refer to detailed descriptions in the foregoing method embodiments. Only brief descriptions are provided herein, and details are not described again.

FIG. 9 is reused. FIG. 9 is a schematic diagram of a structure of a communication apparatus according to an embodiment of this application. The communication apparatus may be configured to perform operations performed by the server in the foregoing method embodiments. For example, the communication apparatus may be configured to perform the operations performed by the server or the AAA server in the method embodiments shown in FIG. 7A and FIG. 7B and FIG. 8A and FIG. 8B. As shown in FIG. 9, the communication apparatus includes a transceiver unit 901 and a processing unit 902.

The transceiver unit 901 is configured to receive a sixth message, where the sixth message includes a first identity and a second identity of a first terminal device.

The processing unit 902 is configured to determine permission of the first terminal device based on the first identity of the first terminal device.

The transceiver unit 901 is further configured to: when the permission of the first terminal device succeeds, send a seventh message to a first network device, where the seventh message includes the second identity of the first terminal device and a third identity of a second terminal device that is paired with the first terminal device, or the seventh message includes the first identity of the first terminal device and a fourth identity of a second terminal device that is paired with the first terminal device.

In a possible implementation, the processing unit 902 is further configured to authenticate the first terminal device based on the first identity of the first terminal device.

In a possible implementation, the server stores the second identity of the first terminal device and the third identity of the second terminal device that have a pairing relationship, or the server stores the first identity of the first terminal device and the fourth identity of the second terminal device that have a pairing relationship.

In a possible implementation, the processing unit 902 is further configured to: obtain, based on the first identity of the first terminal device, the fourth identity of the second terminal device that is paired with the first terminal device, or obtain, based on the second identity of the first terminal device, the third identity of the second terminal device that is paired with the first terminal device.

For example, the transceiver unit 901 may be further configured to perform step 806 (perform a receiving operation) and/or step 809 (perform a sending operation) in FIG. 8A and FIG. 8B.

For example, the processing unit 902 may be further configured to perform step 807 and/or step 808 in FIG. 8A and FIG. 8B.

It may be understood that for specific implementations of the transceiver unit 901 and the processing unit 902, refer to the methods shown in FIG. 7A and FIG. 7B and FIG. 8A and FIG. 8B.

It should be understood that when the communication apparatus is the server or a component that implements the foregoing functions in the server, the processing unit 902 may be one or more processors, and the transceiver unit 901 may be a transceiver; or the transceiver unit 901 may be a sending unit and a receiving unit, the sending unit may be a transmitter, the receiving unit may be a receiver, and the sending unit and the receiving unit are integrated into one component, for example, a transceiver.

When the communication apparatus is a chip, the processing unit 902 may be one or more processors, and the transceiver unit 901 may be an input/output interface, also referred to as a communication interface, an interface circuit, an interface, or the like; or the transceiver unit 901 may be a sending unit and a receiving unit, the sending unit may be an output interface, the receiving unit may be an input interface, and the sending unit and the receiving unit are integrated into one unit, for example, an input/output interface.

The communication apparatus in this embodiment of this application may perform any function performed by the server in the foregoing method embodiments. For specific steps and/or functions that may be performed, refer to detailed descriptions in the foregoing method embodiments. Only brief descriptions are provided herein, and details are not described again.

Figure 10:
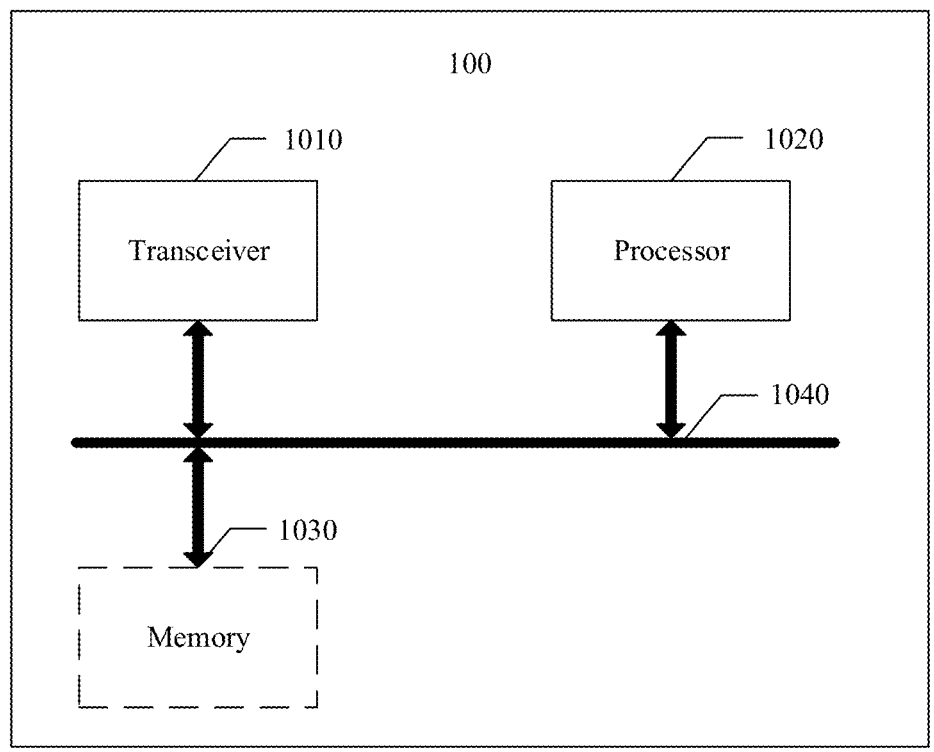
FIG. 10 is a schematic diagram of a structure of a communication apparatus, according to an embodiment of this application.

In a possible implementation, the communication apparatus may be the first network device in the foregoing method embodiments. In this case, the processing unit 902 may be implemented by a processor, and the transceiver unit 901 may be implemented by a transceiver. As shown in FIG. 10, a communication apparatus 100 includes one or more processors 1020 and a transceiver 1010. The processor and the transceiver may be configured to perform functions, operations, or the like performed by the first network device.

For example, the processor may be configured to perform the operation of step 302 in FIG. 3. The transceiver may be configured to perform the operation shown in step 301, step 303, or step 304 in FIG. 3.

For another example, the processor may be configured to perform step 406 to step 408 in FIG. 4A and FIG. 4B. The transceiver may be further configured to perform step 405 (perform a receiving operation), step 409 (perform a sending operation), or step 411 (perform a sending operation) in FIG. 4A and FIG. 4B.

For another example, the processor may be configured to perform step 506 and/or step 507 in FIG. 5. The transceiver may be configured to perform step 505, step 508, or step 510 in FIG. 5.

For another example, the processor may be configured to perform step 606 and/or step 607 in FIG. 6. The transceiver may be configured to perform step 605 and/or step 608 in FIG. 6.

For another example, the processor may be configured to perform step 704 in FIG. 7A and FIG. 7B. The transceiver may be configured to perform step 703 and/or step 705 in FIG. 7A and FIG. 7B.

For another example, the processor may be configured to perform step 810 in FIG. 8A and FIG. 8B. The transceiver may be configured to perform step 809 and/or step 811 in FIG. 8A and FIG. 8B.

In a possible implementation, the communication apparatus may be second network device in the foregoing method embodiments. In this case, the processing unit 902 may be implemented by a processor, and the transceiver unit 901 may be implemented by a transceiver. As shown in FIG. 10, a communication apparatus 100 includes one or more processors 1020 and a transceiver 1010. The processor and the transceiver may be configured to perform functions, operations, or the like performed by the second network device.

For example, the processor may be configured to perform step 306 in FIG. 3. The transceiver may be configured to perform step 304, step 305, or step 307 in FIG. 3.

For another example, the processor may be configured to perform step 410 in FIG. 4A and FIG. 4B. The transceiver may be configured to perform step 401 (perform a receiving operation), step 403 (perform a sending operation), step 404 (perform a receiving operation), step 405 (perform a sending operation), or step 409 (perform a receiving operation) in FIG. 4A and FIG. 4B.

For another example, the processor may be configured to perform step 509 in FIG. 5. The transceiver may be configured to perform step 501, step 503 to step 505, or step 508 in FIG. 5.

For another example, the transceiver may be configured to perform step 601, or step 603 to step 605 in FIG. 6.

For another example, the processor may be configured to perform step 709 in FIG. 7A and FIG. 7B. The transceiver may be configured to perform step 706, step 707, or step 709 in FIG. 7A and FIG. 7B.

For another example, the processor may be configured to perform step 805 in FIG. 8A and FIG. 8B. The transceiver may be configured to perform step 801, step 803, step 804, or step 806 in FIG. 8A and FIG. 8B.

In a possible implementation, the communication apparatus may be the server in the foregoing method embodiments. In this case, the processing unit 902 may be implemented by a processor, and the transceiver unit 901 may be implemented by a transceiver. As shown in FIG. 10, a communication apparatus 100 includes one or more processors 1020 and a transceiver 1010. The processor and the transceiver may be configured to perform functions, operations, or the like performed by the server.

For example, the processor may be configured to perform step 702 in FIG. 7A and FIG. 7B. The transceiver may be configured to perform step 701, step 703, or step 705 in FIG. 7A and FIG. 7B.

For another example, the processor may be further configured to perform step 807 and step 808 in FIG. 8A and FIG. 8B. The transceiver may be configured to perform 806 and/or step 809 in FIG. 8A and FIG. 8B.

In the implementations of the communication apparatus shown in FIG. 10, the transceiver may include a receiver and a transmitter. The receiver is configured to perform a receiving function (or operation), and the transmitter is configured to perform a transmitting function (or operation). The transceiver is configured to communicate with another device/apparatus through a transmission medium. The processor 1020 receives/sends data and/or signaling through the transceiver 1010, and is configured to implement the corresponding methods described in FIG. 3 to FIG. 8A and FIG. 8B in the foregoing method embodiments.

Optionally, the communication apparatus 100 may further include at least one memory 1030, configured to store program instructions and/or data. The memory 1030 is coupled to the processor 1020. Coupling in this embodiment of this application is indirect coupling or a communication connection between apparatuses, units, or modules, may be in an electrical form, a mechanical form, or another form, and is used for information exchange between the apparatuses, the units, or the modules. The processor 1020 may cooperate with the memory 1030. The processor 1020 may execute the program instructions stored in the memory 1030. At least one of the at least one memory may be included in the processor.

In this embodiment of this application, a specific connection medium between the transceiver 1010, the processor 1020, and the memory 1030 is not limited. In this embodiment of this application, the memory 1030, the processor 1020, and the transceiver 1010 are connected through a bus 1040 in FIG. 10. The bus is represented by using a thick line in FIG. 10. A connection manner between other components is merely an example for description, and is not limited thereto. The bus may be classified into an address bus, a data bus, a control bus, and the like. For ease of representation, only one thick line is for representing the bus in FIG. 10, but this does not mean that there is only one bus or only one type of bus.

In this embodiment of this application, the processor may be a general-purpose processor, a digital signal processor, an application-specific integrated circuit, a field programmable gate array or another programmable logic device, a discrete gate or a transistor logic device, a discrete hardware component, or the like, and may implement or perform the methods, steps, and logical block diagrams disclosed in embodiments of this application. The general-purpose processor may be a microprocessor, any conventional processor, or the like. The steps of the methods disclosed with reference to embodiments of this application may be directly performed by a hardware processor, or may be performed by using a combination of hardware in the processor and a software module.

Figure 11:
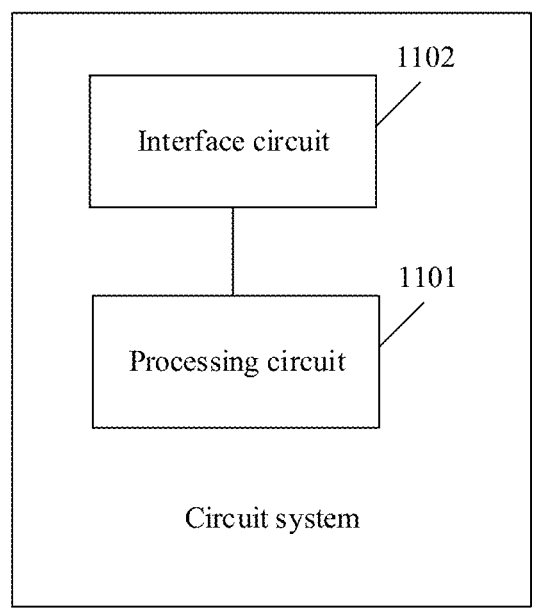
FIG. 11 is a schematic diagram of a structure of a circuit system, according to an embodiment of this application.

In another possible implementation, the communication apparatus may be a circuit system in the first network device. In this case, the processing unit 902 may be implemented by a processing circuit, and the transceiver unit 901 is implemented by an interface circuit. As shown in FIG. 11, a communication apparatus may include a processing circuit 1101 and an interface circuit 1102. The processing circuit 1101 may be a chip, a logic circuit, an integrated circuit, a processing circuit, a system on chip (SoC) chip, or the like. The interface circuit 1102 may be a communication interface. The communication interface may be an interface circuit, an input/output interface, or the like.

For example, the interface circuit may be configured to obtain a first message. The processing circuit may be configured to verify a pairing relationship between a first terminal device and a second terminal device. The interface circuit may be further configured to output a second message and the like.

For another example, the interface circuit may further output the second message and/or a third message. The processing circuit may be further configured to: perform a pairing process, and store a certificate of an unmanned aerial vehicle. Optionally, the processing circuit may be configured to control a memory to store the certificate of the unmanned aerial vehicle.

For another example, the interface circuit may further obtain a seventh message, and output an eighth message.

It may be understood that for specific implementations of the processing circuit and the interface circuit, refer to the method embodiments shown in FIG. 3 to FIG. 8A and FIG. 8B. Details are not described herein again.

In another possible implementation, the communication apparatus may be a circuit system in the second network device. In this case, the processing unit 902 may be implemented by a processing circuit, and the transceiver unit 901 is implemented by an interface circuit. As shown in FIG. 11, a communication apparatus may include a processing circuit 1101 and an interface circuit 1102. The processing circuit 1101 may be a chip, a logic circuit, an integrated circuit, a processing circuit, a system on chip (SoC) chip, or the like. The transceiver circuit 1102 may be a communication interface. The communication interface may be an interface circuit, an input/output interface, or the like.

For example, the interface circuit may be configured to obtain a third message and/or a fourth message. The processing circuit may be configured to verify a pairing relationship between a first terminal device and a second terminal device. The interface circuit may be further configured to output a fifth message.

For another example, the interface circuit may further obtain a registration request, and output a registration response message. For another example, the processing circuit may be further configured to store a SUPI of an unmanned aerial vehicle and a SUPI of a controller that have a pairing relationship. Optionally, the processing circuit may be configured to control a memory to store the SUPI of the unmanned aerial vehicle and the SUPI of the controller that have the pairing relationship.

For another example, the processing circuit may be further configured to determine an AAA server based on routing information of the AAA server. The interface circuit may further obtain a sixth message and/or output the sixth message.

It may be understood that for specific implementations of the processing circuit and the interface circuit, refer to the method embodiments shown in FIG. 3 to FIG. 8A and FIG. 8B. Details are not described herein again.

In another possible implementation, the communication apparatus may be a circuit system in the server. In this case, the processing unit 902 may be implemented by a processing circuit, and the transceiver unit 901 is implemented by an interface circuit. As shown in FIG. 11, a communication apparatus may include a processing circuit 1101 and an interface circuit 1102. The processing circuit 1101 may be a chip, a logic circuit, an integrated circuit, a processing circuit, a system on chip (SoC) chip, or the like. The transceiver circuit 1102 may be a communication interface. The communication interface may be an interface circuit, an input/output interface, or the like.

For example, the processing circuit may be configured to determine permission of a first terminal device based on a first identity of the first terminal device. The interface circuit may be configured to output a seventh message.

For another example, the processing circuit may further perform a bidirectional or unidirectional authentication procedure. Optionally, the processing circuit may also control the interface circuit to perform the bidirectional or unidirectional authentication procedure or the like.

It may be understood that for specific implementations of the processing circuit and the interface circuit, refer to the method embodiments shown in FIG. 3 to FIG. 8A and FIG. 8B. Details are not described herein again.

In the several embodiments provided in this application, it should be understood that the disclosed system, apparatus, and method may be implemented in other manners. For example, the described apparatus embodiments are merely examples. For example, division into the units is merely logical function division. During actual implementation, another division manner may be used. For example, a plurality of units or components may be combined or integrated into another system, or some features may be ignored or not performed. In addition, the displayed or discussed mutual couplings or direct couplings or communication connections may be implemented through some interfaces. The indirect couplings or the communication connections between the apparatuses or the units may be implemented in an electrical form, a mechanical form, or another form.

The units described as separate parts may or may not be physically separate, and parts displayed as units may or may not be physical units, may be located in one place, or may be distributed on a plurality of network units. Some or all of the units may be selected based on actual requirements to achieve the technical effects of the solutions provided in embodiments of this application.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions in this application essentially, or the part contributing to the conventional technology, or all or some of the technical solutions may be implemented in a form of a software product. The computer software product is stored in a readable storage medium and includes several instructions for instructing a computer device (which may be a personal computer, a server, a network device, or the like) to perform all or some of the steps of the methods described in embodiments of this application. The foregoing readable storage medium includes any medium that can store program code, such as a USB flash drive, a removable hard disk, a read-only memory (ROM), a random access memory (RAM), a magnetic disk, or an optical disc.

In addition, this application further provides a computer program. The computer program is used to implement operations and/or processing performed by the first network device in the terminal device verification method provided in this application.

This application further provides a computer program. The computer program is used to implement operations and/or processing performed by the second network device in the terminal device verification method provided in this application.

This application further provides a computer program. The computer program is used to implement operations and/or processing performed by the server in the terminal device verification method provided in this application.

This application further provides a computer-readable storage medium. The computer-readable storage medium stores computer code. When the computer code is run on a computer, the computer is enabled to perform operations and/or processing performed by the first network device in the terminal device verification method provided in this application.

This application further provides a computer-readable storage medium. The computer-readable storage medium stores computer code. When the computer code is run on a computer, the computer is enabled to perform operations and/or processing performed by the second network device in the terminal device verification method provided in this application.

This application further provides a computer-readable storage medium. The computer-readable storage medium stores computer code. When the computer code is run on a computer, the computer is enabled to perform operations and/or processing performed by the server in the terminal device verification method provided in this application.

This application further provides a computer program product. The computer program product includes computer code or a computer program. When the computer code or the computer program is run on a computer, operations and/or processing performed by the first network device in the terminal device verification method provided in this application are/is implemented.

This application further provides a computer program product. The computer program product includes computer code or a computer program. When the computer code or the computer program is run on a computer, operations and/or processing performed by the second network device in the terminal device verification method provided in this application are/is implemented.

This application further provides a computer program product. The computer program product includes computer code or a computer program. When the computer code or the computer program is run on a computer, operations and/or processing performed by the server in the terminal device verification method provided in this application are/is implemented.

This application further provides a wireless communication system. The wireless communication system includes a first terminal device and a first network device in embodiments of this application. Optionally, the wireless communication system further includes a second network device in embodiments of this application. Optionally, the wireless communication system further includes a server in embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, carried out by a first network device, for verifying a pairing relationship between a first terminal device and a second terminal device, the method comprising:
    receiving, from the first terminal device, a first message that comprises:
        an identity of the first terminal device, and
        an identity of a second terminal device paired with the first terminal device;
    verifying, using the identity of the first terminal device and the identity of the second terminal device, a pairing relationship between the first terminal device and the second terminal device; and
    sending, to the first terminal device in accordance with succeeding during the verifying the pairing relationship between the first terminal device and the second terminal device, a second message that comprises first indication information indicating, to the first terminal device, a pairing result of the first terminal device and the second terminal device,
    wherein the first terminal device is an unmanned aerial vehicle (UAV) and the second terminal device is a controller of the UAV, or the first terminal device is the controller of the UAV and the second terminal device is the UAV.

2. The method according to claim 1, wherein the verifying the pairing relationship between the first terminal device and the second terminal device comprises:
    verifying a digital signature based on the identity of the first terminal device and the identity of the second terminal device, and a first public key pre-stored in the first network device,
    wherein the first message further comprises a digital signature of the pairing relationship between the first terminal device and the second terminal device.

3. The method according to claim 2, wherein the first message further comprises an identifier of the first public key that is used to identify the first public key.

4. The method according to claim 2, wherein:
    the first message comprises a credential of the first terminal device and the pairing relationship between the first terminal device and the second terminal device is comprised in the credential of the first terminal device;
    the first message comprises a credential of the first terminal device and a credential of the second terminal device and the credential of the first terminal device and the credential of the second terminal device are used to indicate the pairing relationship between the first terminal device and the second terminal device;
    the first message comprises a credential of the first terminal device or a credential of the second terminal device and partial content of the credential of the first terminal device and content of the credential of the second terminal device are partially the same;
    the first message comprises an identifier of a credential of the first terminal device or an identifier of a credential of the second terminal device and the identifier of the credential of the first terminal device is the same as the identifier of the credential of the second terminal device; or
    the first message comprises an identifier of a credential of the first terminal device and an identifier of a credential of the second terminal device and the identifier of the credential of the first terminal device and the identifier of the credential of the second terminal device are used to indicate the pairing relationship between the first terminal device and the second terminal device.

5. The method according to claim 4, wherein the credential comprises one or more of the group consisting of: a certificate, a public key, and a token.

6. The method according to claim 1, wherein after the succeeding during the verifying the pairing relationship between the first terminal device and the second terminal device, the method further comprises:
    storing the identity of the first terminal device and the identity of the second terminal device.

7. The method according to claim 6, wherein the storing the identity of the first terminal device and the identity of the second terminal device comprises:
- storing the identity of the second terminal device into a context of the first terminal device; and
- storing the identity of the first terminal device into a context of the second terminal device.

8. The method according to claim 1, wherein after the succeeding during the verifying the pairing relationship between the first terminal device and the second terminal device, the method further comprises:
- sending, to a second network device, a third message that comprises the identity of the first terminal device and the identity of the second terminal device, and wherein the identity of the first terminal device and the identity of the second terminal device are used to indicate that the first terminal device and the second terminal device have the pairing relationship.

9. A communication apparatus, comprising:
- a non-transitory computer-readable medium;
- a processor coupled to the non-transitory computer-readable medium;
- wherein the non-transitory computer-readable medium comprises instructions that, when executed by the processor, cause the communication apparatus carry out a method for verifying a pairing relationship between a first terminal device and a second terminal device, the method comprising:
  - receiving, from the first terminal device, a first message that comprises:
    - an identity of the first terminal device, and
    - an identity of a second terminal device paired with the first terminal device; and
  - verifying, using the identity of the first terminal device and the identity of the second terminal device, a pairing relationship between the first terminal device and the second terminal device;
  - sending, to the first terminal device in accordance with succeeding during the verifying the pairing relationship between the first terminal device and the second terminal device, a second message that comprises first indication information indicating, to the first terminal device, a pairing result of the first terminal device and the second terminal device,
  - wherein the first terminal device is an unmanned aerial vehicle (UAV) and the second terminal device is a controller of the UAV, or the first terminal device is the controller of the UAV and the second terminal device is the UAV.

10. The communication apparatus according to claim 9, wherein the verifying the pairing relationship between the first terminal device and the second terminal device comprises:
- verifying a digital signature based on the identity of the first terminal device and the identity of the second terminal device, and a first public key pre-stored in the communication apparatus,
- wherein the first message further comprises a digital signature of the pairing relationship between the first terminal device and the second terminal device.

11. The communication apparatus according to claim 10, wherein the first message further comprises an identifier of the first public key that is used to identify the first public key.

12. The communication apparatus according to claim 10, wherein:
- the first message comprises a credential of the first terminal device and the pairing relationship between the first terminal device and the second terminal device is comprised in the credential of the first terminal device;
- the first message comprises a credential of the first terminal device and a credential of the second terminal device and the credential of the first terminal device and the credential of the second terminal device are used to indicate the pairing relationship between the first terminal device and the second terminal device;
- the first message comprises a credential of the first terminal device or a credential of the second terminal device and content of the credential of the first terminal device and content of the credential of the second terminal device are partially the same;
- the first message comprises an identifier of a credential of the first terminal device or an identifier of a credential of the second terminal device and the identifier of the credential of the first terminal device is the same as the identifier of the credential of the second terminal device; or
- the first message comprises an identifier of a credential of the first terminal device and an identifier of a credential of the second terminal device and the identifier of the credential of the first terminal device and the identifier of the credential of the second terminal device are used to indicate the pairing relationship between the first terminal device and the second terminal device.

13. The communication apparatus according to claim 12, wherein the credential comprises one or more of the group consisting of: a certificate, a public key, and a token.

14. The communication apparatus according to claim 9, wherein
- the method further comprises storing, after the succeeding during the verifying, the identity of the first terminal device and the identity of the second terminal device.

15. The communication apparatus according to claim 14, wherein the storing the identity of the first terminal device and the identity of the second terminal device comprises:
- storing the identity of the second terminal device into a context of the first terminal device; and
- storing the identity of the first terminal device into a context of the second terminal device.

16. The communication apparatus according to claim 9, wherein the after the succeeding during the verifying the pairing relationship between the first terminal device and the second terminal device, the method further comprises:
- sending, to a second network device, a third message that comprises the identity of the first terminal device and the identity of the second terminal device, and wherein the identity of the first terminal device and the identity of the second terminal device are used to indicate that the first terminal device and the second terminal device have the pairing relationship.

17. A communication system, comprising:
- a first terminal device configured to send a first message comprises:
  - an identity of the first terminal device, and
  - an identity of a second terminal device that is paired with the first terminal device; a first network device configured to:
    - receive the first message, and
    - verify, using the identity of the first terminal device and the identity of the second terminal device, a pairing relationship between the first terminal device and the second terminal device; and
  - send, to the first terminal device in accordance with succeeding during the verifying the pairing relationship between the first terminal device and the second terminal device, a second message that comprises first indication information, and wherein the first indication information is used to indicate a pairing result of the first terminal device and the second terminal device, wherein the first terminal device is an unmanned aerial vehicle (UAV) and the second terminal device is a controller of the UAV, or the first terminal device is the controller of the UAV and the second terminal device is the UAV.

18. The communication system according to claim 17, further comprising:
a second network device configured to receive a third message, sent by the first network device, that comprises the identity of the first terminal device and the identity of the second terminal device,
wherein the identity of the first terminal device and the identity of the second terminal device are used to indicate that the first terminal device and the second terminal device have the pairing relationship.

19. The communication system according to claim 17, wherein the first message further comprises an identifier of a first public key that is used to identify the first public key.

20. The communication system according to claim 17, wherein:
the first message comprises a credential of the first terminal device and the pairing relationship between the first terminal device and the second terminal device is comprised in the credential of the first terminal device;
the first message comprises a credential of the first terminal device and a credential of the second terminal device and the credential of the first terminal device and the credential of the second terminal device are used to indicate the pairing relationship between the first terminal device and the second terminal device;
the first message comprises a credential of the first terminal device or a credential of the second terminal device and content of the credential of the first terminal device and content of the credential of the second terminal device are partially the same;
the first message comprises an identifier of a credential of the first terminal device or an identifier of a credential of the second terminal device and the identifier of the credential of the first terminal device is the same as the identifier of the credential of the second terminal device; or
the first message comprises an identifier of a credential of the first terminal device and an identifier of a credential of the second terminal device and the identifier of the credential of the first terminal device and the identifier of the credential of the second terminal device are used to indicate the pairing relationship between the first terminal device and the second terminal device.

* * * * *